United States Patent
Itoi

(10) Patent No.: US 6,445,754 B1
(45) Date of Patent: Sep. 3, 2002

(54) PLAYBACK DATA DETECTING DEVICE

(75) Inventor: Satoshi Itoi, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/373,226

(22) Filed: Aug. 12, 1999

(30) Foreign Application Priority Data

Aug. 13, 1998 (JP) ............................................ 10-242519

(51) Int. Cl.[7] .............................. H03D 1/00; H03L 27/00
(52) U.S. Cl. ...................... 375/341; 375/229; 375/290; 714/795; 360/39
(58) Field of Search .................................. 375/262, 263, 375/265, 286, 290, 341, 229, 230, 231, 232, 233, 234, 235; 714/794, 795, 796; 708/322, 323; 360/46, 48, 49, 65, 39, 55

(56) References Cited

U.S. PATENT DOCUMENTS 5,588,011 A * 12/1996 Riggle
5,729,517 A * 3/1998 Fujiwara et al.
5,938,788 A * 8/1999 Hayashi ...................... 714/794
6,144,515 A * 11/2000 Nishida et al. ............... 360/66
6,304,402 B1 * 10/2001 Nishida et al. ............... 360/66

FOREIGN PATENT DOCUMENTS

| JP | 5-334811 | 12/1993 |
| JP | 6-267203 | 9/1994 |
| JP | 9-148936 | 6/1997 |

OTHER PUBLICATIONS

Japanese Office Action dated Mar. 21, 2001, with partial English translation.

* cited by examiner

Primary Examiner—Jean Corrielus
(74) Attorney, Agent, or Firm—McGinn & Gibb, PLLC

(57) ABSTRACT

The PR(1, 1) equalizer 1 receives signals which are provided from a playback head which detects data in which the number of continuous non-inverse bits is at least "2". The PR(1, 1) equalizer 1 then converts the signals into seven levels of data and ten levels of data, provides them to the four states of Viterbi decoder 2. In Viterbi decoding, an weight is applied to a metric which is obtained from the seven levels of data or the ten levels of data.

27 Claims, 15 Drawing Sheets

3 LEVELS    2 LEVELS

4 LEVELS   7 LEVELS

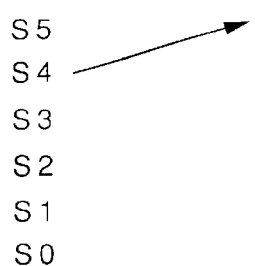
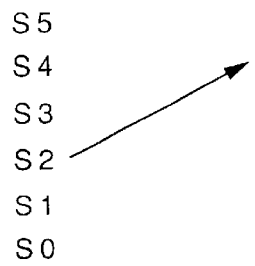
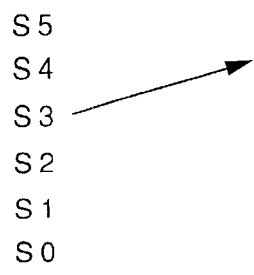
FIG.12A  FIG.12B  FIG.12C
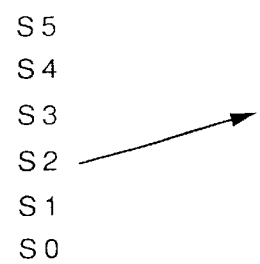
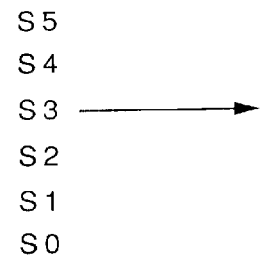
FIG.12D  FIG.12E
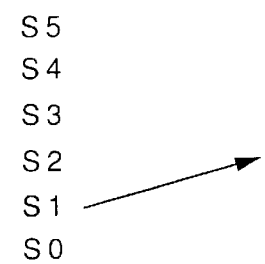
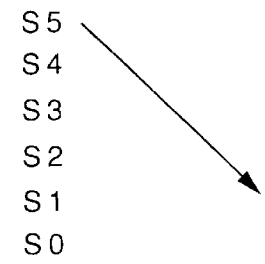
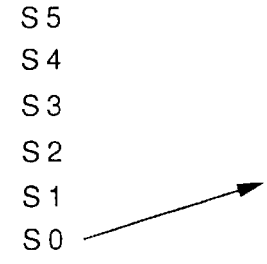
FIG.12F  FIG.12G  FIG.12H
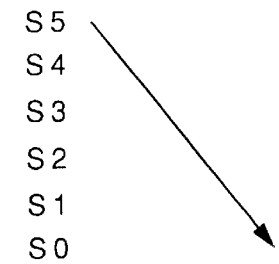
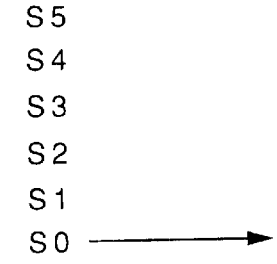
FIG.12I  FIG.12J

PLAYBACK DATA DETECTING DEVICE

BACKGROUND OF THE INVENTION

1. Field of the Invention

The invention relates to a playback data detecting device which is suitable for a digital optical disk storage device, hard disk storage device, and digital VTR and, in particular, to a playback data detecting device which is operable to playback data constraining the number of continuous non-inverse bits to at least "2".

2. Description of the Related Art

Generally, in a digital optical disk storage device, hard disk storage device, or digital VTR, a threshold voltage level is determined for discriminating digital playback data. And when a playback voltage level of a bit of the digital playback data exceeds the threshold voltage level, the bit is discriminated as a high level "H", and, otherwise, the bit is discriminated as a low level "L". Such a technique makes use of characteristics of digital recording, and the technique can be done by a simple circuit because a logic for the discrimination is simple. However, whenever the playback voltage level of a bit which is to be discriminated as a low level slightly exceeds the threshold voltage level due to error, a bit error occurs. Also, when once such a bit error occurs, it is not possible to correct the error at a discriminate/playback block.

For this reason, in a part of a digital optical disk apparatus, a detecting method has been adopted which combines a method known as a partial response (1, 1) with three levels and a Viterbi decoding method of two states.

When a signal is recorded on the apparatus, the method converts the signal into a NRZ (non return to zero recording) signal or a NRZI (nonireturn to zero inverted recording) signal using a pre-coder. On the other hand, when playback of the signal is executed, the method detects the signal using the partial response (1, 1). The detecting method by the use of the partial response (1, 1) carries out data detection using the correlation between playback signals. In the method, when a recording signal "1" is given, playback signals "..001100.." are obtained and level detection of three levels is consequently made.

After the detection due to the partial response (1, 1) is finished, a Viterbi decoding method of three levels and two states is executed. The Viterbi decoding method, taking two playback states, such as state S0 and state S1, makes a transition to state S0 and provides the value of the output signal "0" when the signal of "−1" is input in the state S0. When the signal of "0" is input in the state S0, it makes a transition to state S1 and provides the value of the output signal "1". When the signal,of "0" is input in the state S1, it makes a transition to state S0 and provides the value of the output signal "1". When the signal of "1" is input in the state S1, it makes a transition to state S1 and provides the value of the output signal "0". When the signal violating the above-described state transition rules is inputted, bit error correction is performed by detecting an incorrect state and judging an original state. As a result, the error rate for random errors is improved.

In the above-mentioned method which carries out equalization using the partial response (1, 1) and decoding using the three levels and the Viterbi decoding method of two states, detecting of playback data is performed by bit error correction based on the correlation between the three levels which is provided by the partial response (1, 1). However, when a recording side records data by converting the same into signals which have a minimum inverse metric or interval at least two, namely, the number of continuous non-inverse bits equal to at least "2", the feature of the signals may not be fully utilized. More specifically, it is to be noted that a bit sequence includes at least two continuous signals of "0" or "1" and, as a result, non-inverse bits lasts for at least two bits.

Then, the present inventor has already proposed, in Japanese Laying-Open Publication No. H06-267203(namely, 267203/1994), a playback data detecting device which is operable to perform bit error correction by making use of the above-mentioned feature of the signals. The device is used to record the signals, such as (1, 7) signals which has the continuous non-inverse bits of at least "2". The decoding method used in the device, taking four playback states as state S0 through state S3. In this event, the decoding method makes a transition to state S0 and provides the value of the output signal "0" when the signal of "−1" is input in the state S0. Likewise, when the signal of "0" is input in the state S0, it makes a transition to state S1 and provides the value of the output signal "1". When the signal of "1" is input in the state S1, it makes a transition to state S2 and provides the value of the output signal "0". When the signal of "1" is input in the state S2, it makes a transition to state S2 and provides the value of the output signal "0". When the signal of "0" is input in the state S2, it makes a transition to state S3 and provides the value of the output signal "1". We the signal "0". "−1" is input in the state S3, it makes a transition to state S0 and provides the value of the output signal "0". When the signal violating the above-described state transition rules is inputted, bit error correction is performed by detecting an incorrect state and judging an original state. As a result, the error rate for random errors is improved. Thus, it might be said that the above-mentioned method is equivalent to a combination of the equalization of partial response (1, 1)+a Viterbi decoding method of three levels and four states.

With the playback data device using the combination of the equalization of partial response (1, 1)+the Viterbi decoding method of three levels and four states, the feature of the signals can be almost used. However, the feature is not still used completely, because only three levels of information are utilized about information included in the playback signals. Therefore, the device can be further improved.

Then, the present inventor further proposes, in Japanese Laying-Open Publication No. H05-334811 (namely, 334811/1993), the playback data detecting device which can make use of information in the playback signals more effectively. The device is also used to record signals which have the number of continuous non-inverse bits equal to at least two. The decoding method used in the device produces playback. And the decoding method, taking four playback states such as state S0 through state S3, makes a transition to state S0 and provides the value of the output signal "0" when the three levels of "−1" and the two levels of "−1" are input in the state S0. When the three levels of "0" and the two levels of "1" are input in the state S0, this makes a transition to state S1 and provides the value of the output signal "1". When the three levels of "1" and the two levels of "1" are input in the state S1, it makes a transition to state S2 and provides the value of the output signal "0". When the three levels of "1" and the two levels of "1" are input in the state S2, it makes a transition to state S2 and provides the value of the output signal "0". When the three levels of "0" and the two levels of "−1" are input in the state S2, it makes a transition to state S3 and provides the value of the output signal "1". When the three levels of "−1" and two levels of "−1" are input in the state S3, it makes a transition to state S0 and provides the value of the output signal "0". When the signal violating the above-described state transition rules is inputted, bit error correction is performed by detecting an incorrect state and judging an original state. As a result, the error rate for random errors is improved. Therefore, the method is a combination of equalization of partial response (1, 1) with a Viterbi decoding method of three levels/two levels and four states.

In the above-mentioned decoding method which is realized by a combination of equalization of partial response (1, 1)+the Viterbi decoding method of three levels/two levels and four states, an amount of information to be obtained is twice as large as an amount of information which is obtained from the method using only the three levels and the method using only the two levels. Therefore, in the method, the feature of the playback signals is more effectively used as compared to the method which is a combination of equalization of partial response (1, 1)+the Viterbi decoding method of three levels and four states. Therefore, the ability to correct bit error can be further improved.

However, an information processing device has been developed to become high-performance and miniaturization of the device is more sophisticated. According to development of the device, a demand to higher recording density and higher speed recording/playback is growing from year to year. Therefore, it is highly expected that the above-mentioned playback data detecting device is developed to create a device which has excellent ability to correct bit errors.

SUMMARY OF THE INVENTION

Therefore, it is an object of the invention to provide a playback data detecting device which has higher ability to correct bit errors by improving the above described device which employs the equalization of partial response (1, 1) together with the Viterbi decoding method of three levels/two levels and four states.

Also, it is an object of the invention to provide a playback data detecting device which has still higher ability to correct bit errors by extending the equalization of partial response (1, 1)+the Viterbi decoding method of three levels/two levels and four states to Viterbi decoding method of six states or Viterbi decoding method of ten states.

According to a first aspect of the invention, there is provided a playback data detecting device which includes a PR(1, 1) equalizer which receives playback signals of the recording data, converts the signals into three levels of data and two levels of data which resides in the intermediate point between the three levels of data in time by PR(1, 1) detecting which employs the correlation between the signals, and a Viterbi decoder of four states which performs Viterbi decoding based on transition rules for transition of playback states S0, S1, S2, and S3, which correspond to the three levels of data and the two levels of data.

According to a second aspect of the invention, there is provided a playback data detecting device which includes a PR(1, 2, 1) equalizer which receives playback signals of the recording data, converts the signals into four levels of data and seven levels of data which resides in the intermediate point between the four levels of data in time by PR(1, 2, 1) detecting which employs the correlation between the signals, and a Viterbi decoder of six states which performs Viterbi decoding based on transition rules for transition of playback states S0, S1, S2, S3, S4 and S5, which correspond to the four levels of data and the seven levels of data.

According to a third aspect of the invention, there is provided a playback data detecting device which includes a PR(1, 2, 2, 1) equalizer which receives playback signals of the recording data, converts the signals into seven levels of data and ten levels of data which resides in the intermediate point between the seven levels of data in time by PR(1, 2, 2, 1) detecting which employs the correlation between the signals, and a Viterbi decoder which of ten states performs Viterbi decoding based on transition rules for transition of playback states S0, S1, S2, S3, S4, S5, S6, S7, S8 and S9, which correspond to the seven levels of data and the ten levels of data.

BRIEF DESCRIPTION OF THE DRAWINGS:

FIGS. 12A–12J show a diagram for the purpose of illustrating path connecting based on a partial response (1, 2, 1)+a Viterbi decoding method of six states;

FIGS. 19A–19P show a diagram for the purpose of illustrating path connecting based on a partial response (1, 2, 2, 2)+a Viterbi decoding method of ten states;

DESCRIPTION OF THE PREFERRED EMBODIMENT

[First Embodiment of the Invention]

In the embodiment of the invention, a method of the invention is applied to a playback data detecting device which detects playback data which has the continuous non-inverse bits of at least two and performs, on a receiving V side, a partial response (1, 1) equalization method, to decode the playback data by a Viterbi decoding method of four states.

Figure 1:
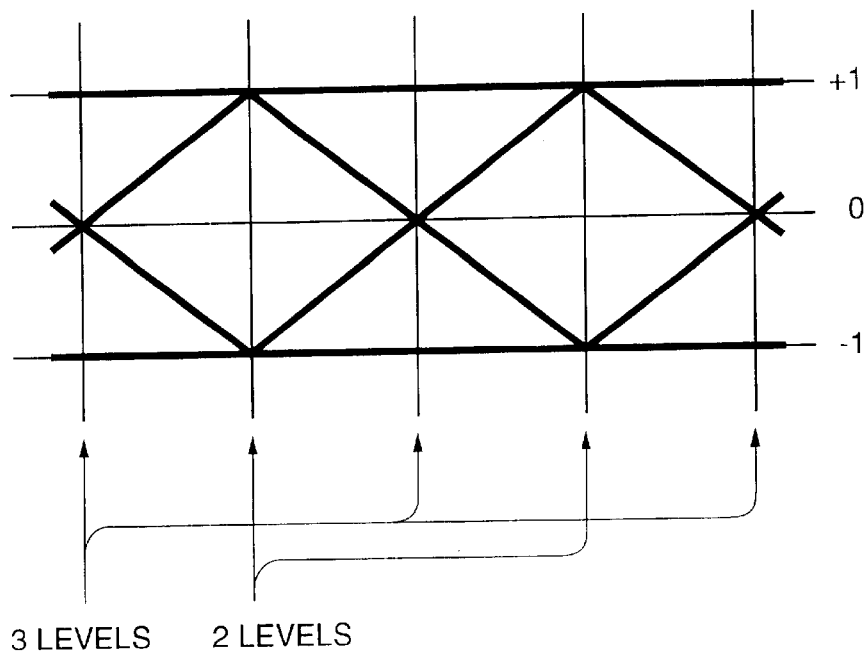
FIG. 1 shows a graph representing a series of an eye pattern of playback waveform based on a partial response (1, 1)

With the partial response (1, 1), a waveform recorded as "1" is played back or reproduced as "11". Also, the partial response (1, 1) playbacks a signal as a waveform "121", which is formed by adding. "110" and "011", when the signal is recorded as "11". When these waveforms are superposed on each other and equally distributed to a plus (+) region and a minus (−) region, it is possible to obtain an eye pattern as shown in FIG. 1. Taking this into consideration, a playback signal is converted into three levels by the partial response PR(1, 1) detecting technique using the intersymbol correlation on a playback or a reproduction side. Further, the three levels, and two levels which reside in the intermediate points between the three levels in time are used as data.

Figure 2:
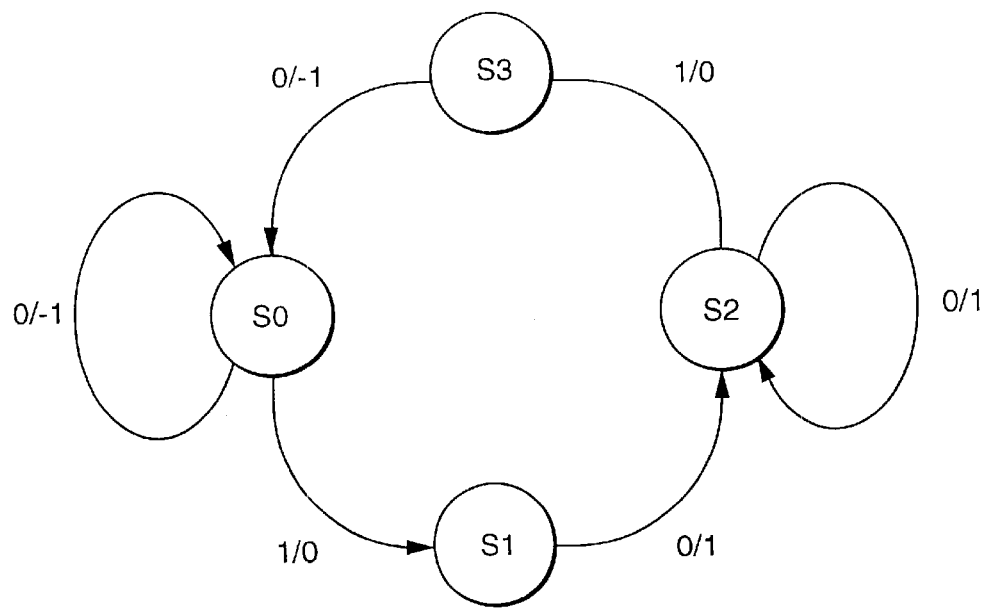
FIG. 2 shows a state transition diagram of three levels of data based on a partial response (1, 1)+a Viterbi decoding method of four states.
Figure 3:
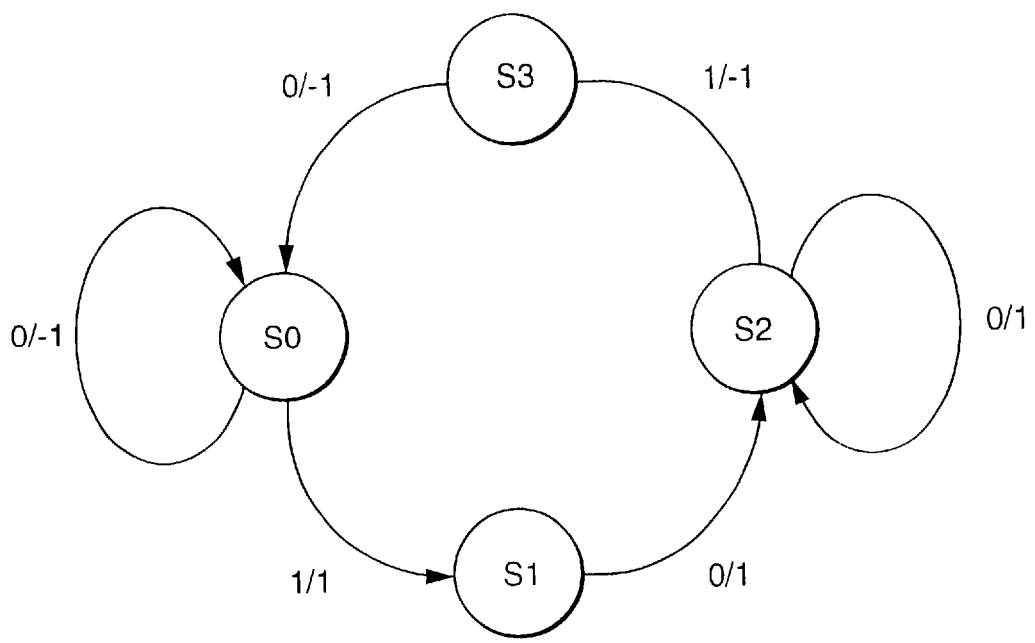
FIG. 3 shows a state transition diagram of two levels of data based on a partial response (1, 1)+a Viterbi decoding method of four states.
Figure 4:
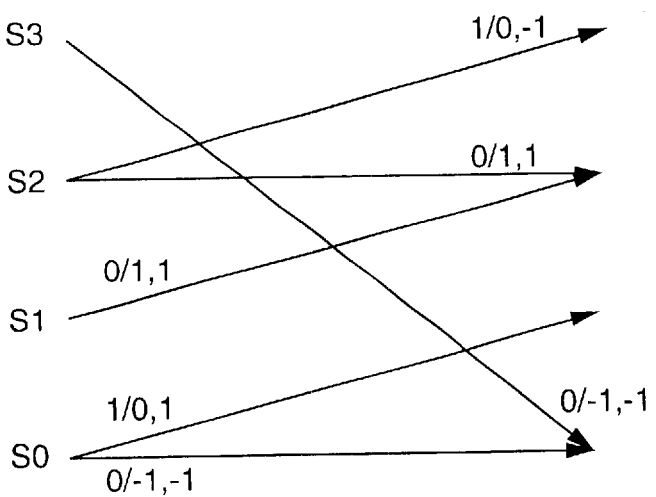
FIG. 4 shows a trellis diagram of three levels/two levels of data based on a partial response (1, 1)+a Viterbi decoding method of four states.

Next, description is made about the first embodiment of the invention with reference to FIGS. 2 through 4.

In fractional numbers shown in FIG. 2, denominators represent the input data of three levels, and numerators represent output data from a decoder. In fractional numbers shown in FIG. 3, denominators represent the input data of two levels, and numerators represent output data from a decoder. In fractional numbers shown in FIG. 4, former numbers in denominators represent the input data of three levels, later numbers in the denominators represent the input data of two levels, and numerators represent output data from a decoder.

In the first embodiment of the invention, four playback states S0 through state S3 are used. The states S0 through S3 make transition in a manner as shown in FIG. 2 for the data of three levels, and make transition as shown in FIG. 3 for the data of two levels. In FIG. 4, both the data of the three levels and the data of the two levels are shown on a trellis diagram which has an abscissa representing a time. Specifically, in the Viterbi decoding method, the following state transition rules are used.

When "−1" and "−1" are given as the data of three levels and the data of two levels respectively, in a state S0, it makes a transition to a state S0 and provides the value "0" as the decoder's output signal.

When the three levels of "0" and the two levels of "1" are inputted in the state S0, it makes a transition to a state S1 and provides the value "1" as the decoder's output signal.

When the three levels of "1" and the two levels of "1" are input in the state S1, it makes a transition to state S2 and provides the value "0" as the decoder's output signal.

When the three levels of "1" and the two levels of "1" are input in the state S2, it makes a transition to state S2 and provides the value "0" as the decoder's output signal.

When the three levels of "0" and the two levels of "−1" are input in the state S2, it makes a transition to state S3 and provides the value "1" as the decoder's output signal.

When the three levels of "−1" and the two levels of "31 1" are input in the state S3, it makes a transition to state S0 and provides the value "0" as the decoder's output signal.

And when the signal violating the above-described state transition rules is inputted, bit error correction is performed by detecting an incorrect state and judging an original state.

Next, more detail description is made with reference to FIGS. 5A–5F through 7.

For the PR(1, 1)+the Viterbi decoding method of four states, let $y_{00}$ be the detected three levels of data, and $y_{01}$ be the detected two levels of data. In this case, the probabilities that transition from state Sm to state Sn occurs are shown as follows. Herein, $\tau^2$ is a variance, its approximate value is obtained from experiments.

[for the three levels of data $y_{00}$]

probability of transitions S0->S0, S3->S0: $\{1/((2\pi\tau^2)^{1/2})\} \cdot \exp\{-(y_{00}+1)^2/(2\tau^2)\}$ probability of transitions S0->S1, S2->S3: $\{1/((2\pi\tau^2)^{1/2})\} \cdot \exp\{-(y_{00})^2/(2\tau^2)\}$ probability of transitions S1->S2, S2->S2: $\{1/((2\pi\tau^2)^{1/2})\} \cdot \exp\{-(y_{00}-1)^2/(2\tau^2)\}$

[for the two levels of data $y_{01}$]

probability of transitions S0->S0, S2->S3, S3->S0: $\{1/((2\pi\tau^2)^{1/2})\} \cdot \exp\{-(y_{00}-1)^2/(2\tau^2)\}$ probability of transitions S0->S1, S1->S2, S2->S2: $\{1/((2\pi\tau^2)^{1/2})\} \cdot \exp\{-(y_{00}-1)^2/(2\tau^2)\}$ Let a transition metric (branch metric) be a negative logarithm of the probability. Because a relative relationship among the branch metrics is important, the same number may be added to the branch metrics or multiplied by the branch metrics to create more simple expressions. After the simplification, the following metrics are obtained. Further, all the metrics may be divided by two.

[for the three levels of data $y_{00}$]

branch metric of transitions S0->S0, S3->S0: $2y_{00}+1$ branch metric of transitions S0->S1, S2->S3 : 0 branch metric of transitions S1->S2, S2->S2: $-2y_{00}+1$

[for the two levels of data $y_{01}$]

branch metric of transitions S0->S0, S2->S3, S3->S0: $2y_{01}+1$ branch metric of transitions S0->S1, S1->S2, S2->S2: $-2y_{01}+1$ Let each of path metrics $m_n(S3)-m_n(S0)$ be the corresponding negative logarithm of probability during the states S3–S0 at time n. And let each of path metrics $m_{n-1}(S3)-m_{n-1}(S0)$ be the corresponding negative logarithm of probability during the states S3–S0 at time n−1.

With referring to FIG. 2, the path metrics for the three levels of data $y_{00}$ are shown as follows.

$m_n(S3)=m_{n-1}(S2)$ $m_n(S2)=\min[m_{n-1}(S1)-2y_{00}+1, m_{n-1}(S2)-2y_{00}+1]$ $m_n(S1)=m_{n-1}(S0)$ $m_n(S0)=\min[m_{n-1}(S3)+2y_{00}+1, m_{n-1}(S0)+2y_{00}+1]$ With referring to FIG. 3, the path metrics for the two levels of data $y_{01}$ are shown as follows.

$m_n(S3)=m_{n-1}(S2)+2y_{01}+1$ $m_n(S2)=\min[m_{n-1}(S1)-2y_{00}+1, m_{n-1}(S2)-2y_{01}+1]$ $m_n(S1)=m_{n-1}(S0)-2y_{01}+1$ $m_n(S0)=\min[m_{n-1}(S3)+2y_{01}+1, m_{n-1}(S0)+2y_{01}+1]$ Herein, using both the three levels of data and the two levels of data, equations as follows are obtained with referring to FIG. 4.

$$m_n(S3) = m_{n-1}(S2) + 2y_{01} + 1 \quad (1)$$

Figure 5A:
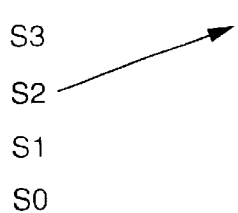
FIGS. 5A–5F show a diagram for the purpose of illustrating path connecting based on a partial response (1, 1)+a Viterbi decoding method of four states.

(the path transits as shown in FIG. 5A)

$$m_n(S2) = \min[m_{n-1}(S1) - 2y_{00} + 1 - 2y_{01} + 1, \ m_{n-1}(S2) - 2y_{00} + 1 - 2y_{01} + 1] \quad (2)$$

Figure 5B:
Figure 5C:
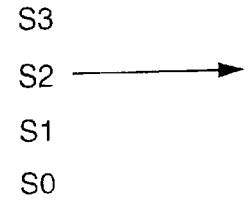

(the path transits as shown in FIG. 5B when the first term is selected, and transits as shown in FIG. 5C when the second term is selected)

$$m_n(S1) = m_{n-1}(S0) - 2y_{01} + 1 \quad (3)$$

Figure 5D:
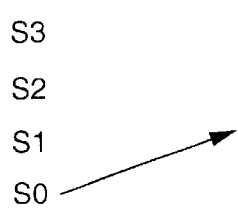

(the path transits as shown in FIG. 5D)

$$m_n(S0) = \min[m_{n-1}(S3) + 2y_{00} + 1 + 2y_{01} + 1, \ m_{n-1}(S0) + 2y_{00} + 1 + 2y_{01} + 1] \quad (4)$$

Figure 5E:
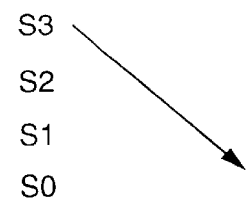
Figure 5F:
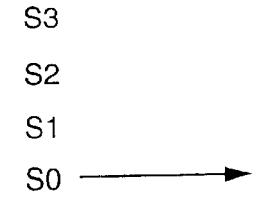

(the path transits as shown in Fig. 5E when the first term is selected, and transits as shown in FIG. 5F when the second term is selected)

Since the calculations are enough to obtain the relative relationship among the $m_n(S3)$–$m_n(S0)$, the same number may be added to them or multiplied by them. For example, $m_n(S0)$ may be subtracted from each of the $m_n(S3)$–$m_n(S0)$ to produce new $m_n(S3)$–$m_n(S0)$. In this case, the new $m_n(S0)$ is "0".

In the embodiment of the invention, the three levels/two levels of data are weighted and the playback data is determined. This is because the importance of the three levels of data and two levels of data may be different from each other according to characteristics of recording/playback or recording medium. To weight each of the three levels/two levels of data, an error rate will be further decreased. The actual optimal weight may be determined by some experiments.

Herein, let w be a weight coefficient of the three levels of data. Then, weight coefficient of the two levels of data is 1–w, the following equations are determined.

$$m_n(S3) = m_n(S2) + (1-w)(2y_{01} + 1) \quad (1)$$

(the path transits as shown in FIG. 5A)

$$m_n(S2) = \min[m_{n-1}(S1) + w(-2y_{00} + 1) + (1-w)(2y_{01} + 1), \ m_{n-1}(S2) + w(-2y_{00} + 1) + (1-w)(-2y_{01} + 1)] \quad (b\ 2)$$

(the path transits as shown in FIG. 5B when the first term is selected, and transits as shown in FIG. 5C when the second term is selected)

$$m_n(S1) = m_{n-1}(S0) + (1-w)(-2y_{01} + 1) \quad (3)$$

(the path transits as shown in FIG. 5D)

$$m_n(S0) = \min[m_{n-1}(S3) + w(-2y_{00} + 1) + (1-w)(2y_{01} + 1), \ m_{n-1}(S0) + w(-2y_{00} + 1) + (1-w)(-2y_{01} + 1)] \quad (b\ 4)$$

(the path transits as shown in FIG. 5E when the first term is selected, and transits as shown in FIG. 5F when the second term is selected)

Since the calculations are enough to obtain the relative relationship among the $m_n(S3)$–$m_n(S0)$, the same number may be added to them or multiplied by them. For example, $m_n(S0)$ may be subtracted from each of the $m_n(S3)$–$m_n(S0)$ to produce new $m_n(S3)$–$m_n(S0)$. In this case, the new $m_n(S0)$ is "0".

The above example, the weight coefficient w is applied to the three levels of data and the weight coefficient 1–w is applied to the two levels of data. However, the weight coefficient w may be applied to the two levels of data and the weight coefficient 1–w may be applied to the three levels of data.

Also, according to characteristics of recording/playback and recording medium, the importance of the three levels/ two levels of data may be different for each level. Then, preparing two kinds of weight coefficients w0, w1, when data level of the three levels (or two levels) of data exceeds (or equal to) a predetermined threshold value L, w0 may be assigned as the weight coefficient, and when data level of the three levels (or two levels) of data is less than or equal to the threshold value L, w1 is assigned as the weight coefficient. To do this, error rate will be further decreased. The actual optimal weight coefficient and the threshold value may be determined by some experiments.

For example, let the threshold value L be –0.2, w0 be 0.375, and w1 be 0.75. Herein, if the three levels of data should be controlled, the three levels and the two levels of data are shown as follows.

The three levels of data; –0.8, –0.7, 0.1, 0.6, 0.3, –0.6

The two levels of data; –0.7, –0.4, 0.3, 0.5, –0.4, –0.9

As a result, w0 is assigned to w when the three levels of data exceeds to the threshold value L, and w1 is assigned to w when the three levels of data is less than the threshold value L. Therefore, value of w transits as follows; 0.75, 0.75, 0.375, 0.375, 0.375, 0.75.

As described above, $m_n(S3)$–$m_n(S0)$ are calculated according to (1)–(4), paths of state transition are determined as shown in FIGS. 5A–5F (hereafter may be called (a)–(f), respectively, for convenience of description), and the determined paths are arranged.

Next, description is made about the paths of state transition. For the above-described (1)–(4), (a) is always selected at (1), (d) is always selected at (3), (b) or (c) is selected at (2), and (e) or (f) is selected at (4). In this case, for example, when (c) is selected at (2) and (e) is selected at (4) at time (n), (a), (c), (d), and (e) are selected by gathering (1)–(4). Herein, four paths, (a)S2–>S3, (c)S2–>S2, (d)S0–>S1, and (e)S3–>S0, are selected from time n–1 to time n.

Hereinafter, four paths of state transition are selected for each time, and the paths are arranged.

Figure 6:
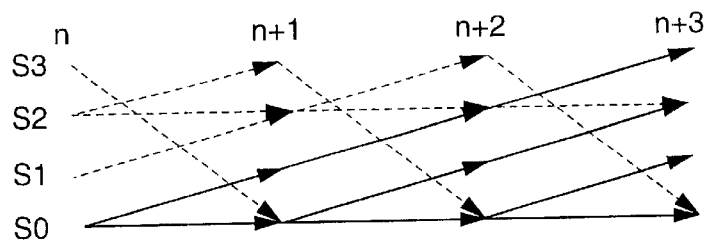
FIG. 6 shows a diagram for the purpose of illustrating path merge based on a partial response (1, 1)+a Viterbi decoding method of four states.

Next, determination of path merge is performed. Example of the determination is shown in FIG. 6.

If (4):(f) is selected at time (n+1), (2):(b),(4):(f) are selected at time (n+2), and (2):(b),(4):(f) are selected at time (n+3), it is found that paths are connected into S0(•) at time n by going back the selected paths from the all states at time (n+3). This is referred to as gathering of paths into a point, in other words, "path merge". When the path merge occurred, former paths are determined from a point(•) to which the paths are gathered, and former data are determined using numerators of fractional numbers shown in FIG. 4.

Figure 7:
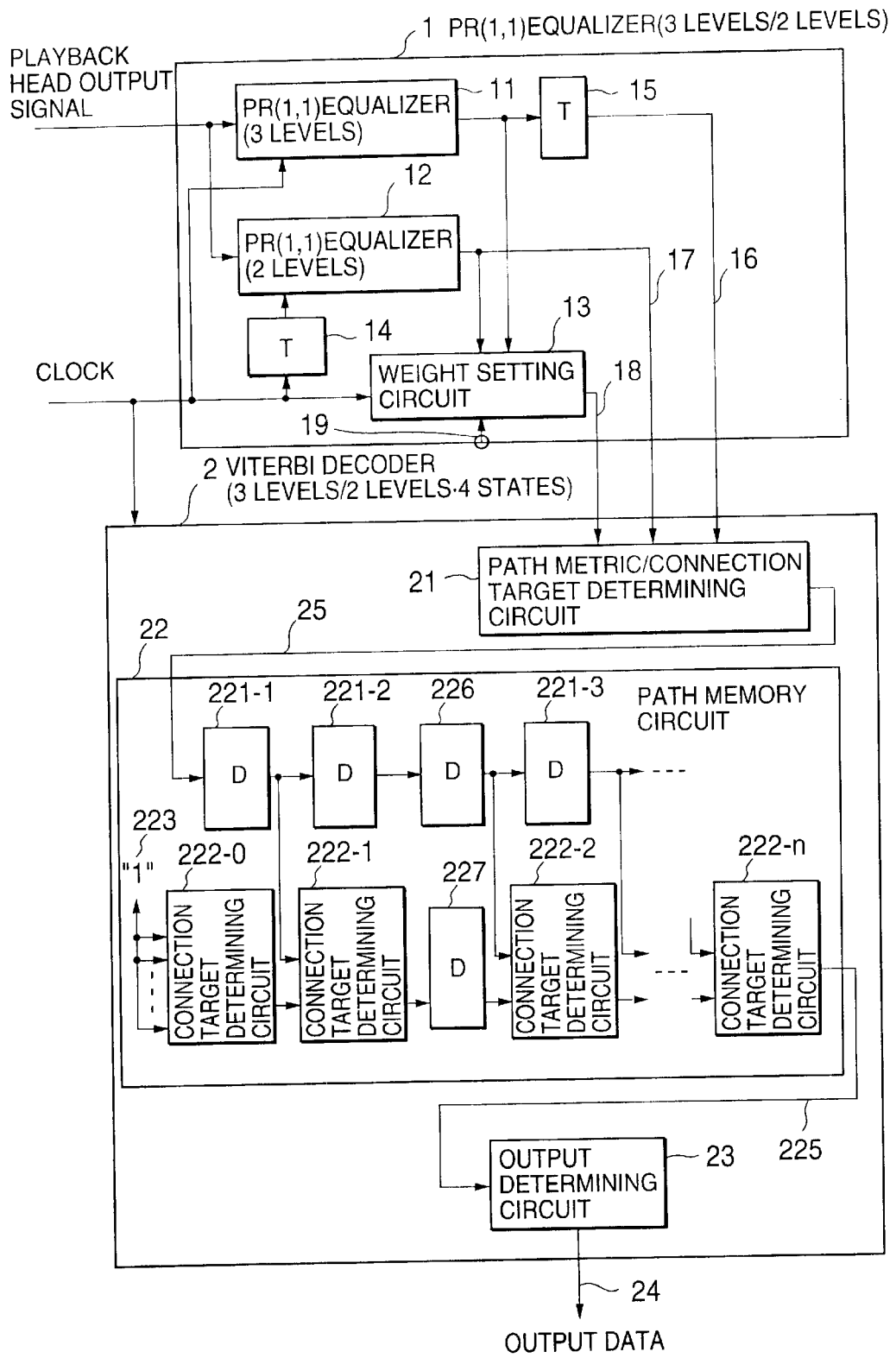
FIG. 7 shows a block diagram of one embodiment of a playback data detecting device according to the invention.

FIG. 7 shows a block diagram of a playback data detecting device which performs the above-mentioned method. The playback detecting device includes a PR(1, 1) equalizer 1 which provides two types of data, namely, three levels of data and two levels of data, and a Viterbi decoder 2 with three levels/two levels and four states.

The PR(1, 1) equalizer 1 is given output signals which are detected, for example, by a playback head. In this case, output signals may be recorded data recorded as a recorded code which has a minimum inverse metric of at least two. The PR(1, 1) equalizer 1 then converts the playback signals into three levels of data and two levels of data which resides in the intermediate time point between the three levels of data by carrying out partial response (1, 1) detection by using intersymbol correlation. Thereafter, the PR(1, 1) equalizer 1 supplies the three levels of data 16 and two levels of data 17 to the Viterbi decoder 2.

Such an equalizer 1, for example, may include a PR(1, 1) equalizer 11 which converts the playback head signals into the three levels of data, and a PR(1, 1) equalizer 12 which converts the signals into the two levels of data as shown in FIG. 7. In this case, operation clock signal may be delayed by a half a clock cycle by a delay circuit 1 and may be thereafter supplied to the PR(1, 1) equalizer 12. Consequently, the PR(1, 1) equalizer 12 can perform conversion of the two levels of data which resides in the intermediate time point between the three levels of data. Also, since the three levels of data detected by the PR(1, 1) equalizer 11 and the two levels of data detected by the PR(1, 1) equalizer 12 after a half clock cycle is past are provided in pair output timing of the PR(1, 1) equalizer 11 is delayed a half clock cycle by a delay circuit 15 to match output timing of the three levels of data 16 to the Viterbi decoder 2 with output timing of the two levels of data 17 to the Viterbi decoder 2.

Further, the equalizer 1 includes a weight setting circuit 13 which sets a weight coefficient w to the three levels of data or the two levels of data. The weight coefficient 18 is supplied from the weight setting circuit 13 to the Viterbi decoder 2. A setting terminal 19 is connected to the weight setting circuit 13. The weight setting circuit 13 may select the value of the weight coefficient 18 or operation mode according to data given from the setting terminal 19. In other words, the weight coefficient and the operation mode can be selected in the 9 following manner in response to the data given from the setting terminal 19 to the weight setting circuit 13.

(a) The weight coefficient w is always kept at a constant value.

(b) The two weight coefficients w0 and w1 are indicated together with a threshold value L to the three levels of data. Herein, when the level of the three levels of data from the PR(1, 1) equalizer 11 is not smaller than (namely, larger than or equal to) the threshold value L, w0 is supplied as the weight coefficient to the three levels of data from the PR(1, 1) equalizer 11 for each clock cycle. When the level of the three levels of data is not greater than (namely, less than or equal to) the threshold value L, w1 is supplied as the weight coefficient to the three levels of data from the PR(1, 1) equalizer 11 for each clock cycle.

(c) The two weight coefficients w0 and w1 are indicated together with a threshold value L to the two levels of data. Herein, when the level of the two levels of data from the PR(1, 1) equalizer 12 is not smaller than (namely, larger than or equal to) the threshold value L, w0 is supplied as the weight coefficient to the two levels of data from the PR(1, 1) equalizer 12 for each clock cycle. When the level of the two levels,of data is not greater than (namely, less than or equal to) the threshold value L, w1 is supplied as the weight coefficient to the two levels of data from the PR(1, 1) equalizer 12 for each clock cycle.

Responsive to the three levels of data 16, the two levels of data 17, and the weight coefficient 18 from the PR(1, 1) equalizer 1 for each clock cycle, the Viterbi decoder 2 performs Viterbi decoding operation according to a predetermined state transition rules to produce an output data 24. In the illustrated example, the Viterbi decoder 2 includes a path metric/connection target determining circuit 21, a path memory circuit 22, and an output determining circuit 23.

The path metric/connection target determining circuit 21 determines $m_n(S3)-m_n(S0)$ based on the three levels of data 16 ($y_{00}$), the two levels of data 17 ($Y_{01}$), $m_{n-1}(S3)-m_{n-1}(S0)$, and the weight coefficient 18, and determines a connection target which is connected at a previous time point before one clock cycle from the present time point for each of states S2 and S0. The determining circuit 21 provides the results to the path memory circuit 22 as connection target data 25. In this event, the connection target data 25 includes "0" when S2 at the present time point is connected to S1 at the previous time point before one clock cycle from the present time point, and includes "1" when S2 at the present time point is connected to S2 at the previous time point before one clock cycle from the present time point. Further, the connection target data 25 includes "0" when the connection is made from S0 at the present time point to S3 at a time point before one clock cycle from the present time point, and includes "1" when the connection is made from S0 at the present time point to S0 at a time point before one clock cycle from the present time point. Each data is represented by two bits corresponding to S2 and S0.

The path memory circuit 22 stores the connection target data 25 at every clock cycle and keep the target data over several tens of steps (clock cycles) and examines a sequence of the target data and selects a single one of paths based on the connection target data 25.

The path memory circuit 22 includes data latches (for example, D-type flip flops) 221-1, 221-2, 221-3, . . . each of which stores the connection target data 25 over several tens of stages (clock cycles). The current data is supplied to the data latch which resides in the leftmost one of the data latches and is successively delayed or shifted rightwards of FIG. 7. Therefore, as the data latches go rightwards older data is stored in the data latches. Also, for each steps of the data latches, the connection target determining circuits 222-1, 222-2, . . . , 222-n are connected, and the connection target determining circuit 222-0 may be considered to be connected to a zeroth step of the data latches.

The connection target determining circuit 222-0 for the zeroth step receives data 223 in which all bits are "1" as initial value. The circuit 222-0 provides output data 224 composed of the bits which are in one-to-one correspondence to the states S0–S3 and which take "1" to specify any one of the states S0–S3 in the next clock cycle.

Each of the connection target determining circuits 222-1, 222-2, . . . , 222-n for the steps after the zeroth step receives four bits of output data from a previous step of the connection target determining circuit and the connection target data 25 from the data latch which corresponds to the step. Under the circumstances, each determining circuit determines, for each states S0–S3, whether or not the state may be selected and sets "1" to the bit which corresponds to the state if the state may be selected. On the other hand, the determining circuit sets "0" to the bit which corresponds to the state if the state may not be selected, and sends the resulting bits to another connection target determining circuit for the next step.

Therefore, for each of the states S3, S2, S1, and S0, the connection target to which the,path is connected at the time point before one clock cycle from the present time point is determined based on the following elements.

(1) The received two bits of data from the data latch which corresponds to the step.

(2) Whether the connection at the next clock cycle is performed or not is determined based on the received four bits from the connection target determining circuit for the former step.

(3) Four bits of data which represents the path may be connected at a time point before one clock cycle from the present time point is sent to the connection target determining circuit for the next step.

Specifically, description will be made about the state. S3. If the connection to S3 is made one clock after in response to an output sent from a previous one of the determining circuit, the bit which corresponds to S2 of the output supplied to the next one of the determining circuit is set into "1". As to the state S2, the connection is performed at the next clock cycle in response to an output sent from, a previous one of the determining circuit. When data which corresponds to S2 of an output sent from a corresponding step of the data latches takes "0", a bit which corresponds to S1 supplied to the next stage of the determining circuits is set into "1". Otherwise, the bit which corresponds to S2 of an output supplied to the next stage of the determining circuit is set into "1".

For state S1, when the connection at the next clock cycle is performed in response to an output from the connection target determining circuit for the former step, "1" is set to the bit, which corresponds to the state S0 included in an output to the connection target determining circuit for the next step.

For state S0, when the connection at the next clock cycle is performed in response to an output from the connection target determining circuit for the former step and when data which corresponds to state S0 from data latch which corresponds to the step is "0", "1" is set to the bit, which corresponds to the state S3 included in an output to the connection target determining circuit for the next step. On the other hand, when data which corresponds to state S0 from data latch which corresponds to the step is "1", "1" is set to the bit, which corresponds to the state S0, in an output to the connection target determining circuit for the next step.

In any case, when "1" is not set to a bit, the value of the bit is "0".

For example, it is assumed that the connection target determining circuit 222-1 receives the four bits from the circuit 222-0 and the two bits from the data latch 221-1, at a clock cycle n+3.

If one bit which is included in the four bits from the circuit 222-0 and which corresponds to S3 is set to "1", the bit corresponding to S2 in the output is set into "1".

If one bit which is included in the four bits from the circuit 222-0 and which corresponds to S2 is set to "1", and one bit which is included in the two bits from the data latch 221-1 and which corresponds to S2 is set to "0"1, the bit corresponding to S1 in the output is set into "1".

If one bit which is included in the four bits from the circuit 222-0 and which corresponds to S1 is set to "1", the bit corresponding to S0 in the output is set into "1".

If one bit which is included in the four bits from the circuit 222-0 and which correspond s to S0 is set to "1"1, and one bit which is included in the two bits from the data latch 221-1 and which corresponds to S0 is set to "1", the bit corresponding to S0 in the output is set into "1".

As described above, the bits which corresponds to S0, S1, and S2 are each set to "1" and the bit which corresponds to S3 is not set any value.

Therefore, the bits (S0, S1, S2, S3) which are supplied from the circuit 222-1 at clock cycle n+2 are determined as (1, 1, 1, 0). Repeating the above operations in several steps, path merge is performed and a single path is determined.

As described above, by using multiple connections of the connection target determining circuits 222-0, 222-1, . . . , 222-n, the states to which the path may be connected are limited or decreased as the steps proceed, that is, as are returned back to the past clock cycle. Finally, paths are merged with a single path, and thus, path merge is carried out.

An output 225 of the path memory circuit 22 is obtained from the connection target determining circuit for the last step 222-n, and is configured by four bits which correspond to S0, S1, S2, and S3 one by one. The output 225 is set to "1" when the path may be connected to any of states S0–S3, and is set to MOO when the path may not be connected. Herein, when the path merge is performed, one bit of the four bits is set to "1" and the other bits are set to "0".

Data latches 226 and 227 in the path memory circuit 22 shown in FIG. 7 have timing adjust functions to prevent hardware malfunction which occurs when the delay time exceeds a clock cycle due to multiple connections.

An output calculating circuit 23 determines an output data 24 from a path which is uniquely determined from the output 225 of the path memory circuit 22. Herein, the output data 24 is obtained based on the numerators of the fractional numbers shown in FIG. 4.

When the path merge is not performed, that is, there are at least two bits including value "1" in the four bits of output 225, the number of paths (bits) which corresponds to the output data "0" in the output 225 is compared with the number of paths (bits) which corresponds to the output data "1" in the output 225. If the former number is larger than the later, the output is "0", and otherwise, the output is "1".

[Second Embodiment of the Invention]

In the embodiment of the invention, a method of the invention is applied to a playback data detecting device which detects playback data which has the continuous non-inverse bits of at least two and performs, on a receiving side, a partial response (1, 2, 1) equalization method, to decode the playback data by a Viterbi decoding method of six states.

Figure 8:
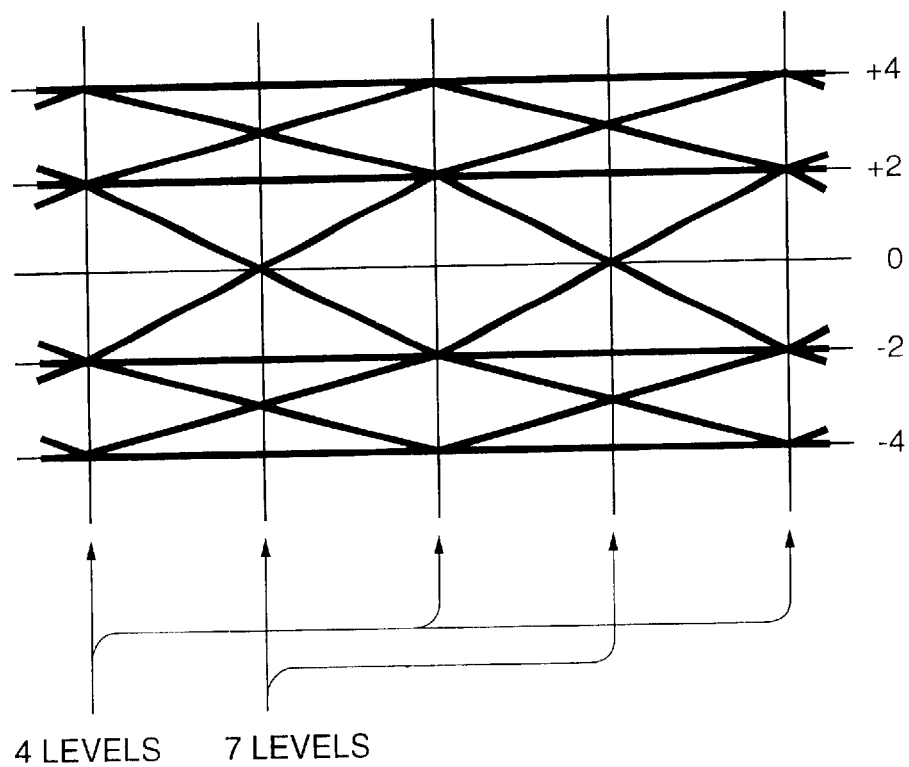
FIG. 8 shows a graph representing a series of an eye pattern of playback waveform based on a partial response (1, 2, 1)

With the partial response (1, 2, 1), a waveform recorded as "1" is played back or reproduced as of "121". Also, the partial response (1, 2, 1) playbacks a signal as a waveform "1331", which is formed by adding "1210" and "0121", when the signal is recorded as "11". When these waveforms are superposed on each other and equally distributed to a plus (+) region and a minus (−) region, it is possible to obtain an eye pattern as shown in FIG. 8. Taking this into consideration, a playback signal is converted into four levels by the partial response PR(1, 2, 1) detecting technique using the intersymbol correlation on a playback or a reproduction side. Further, the four levels, and seven levels which reside in the intermediate points between the four levels in time are used as data.

Figure 9:
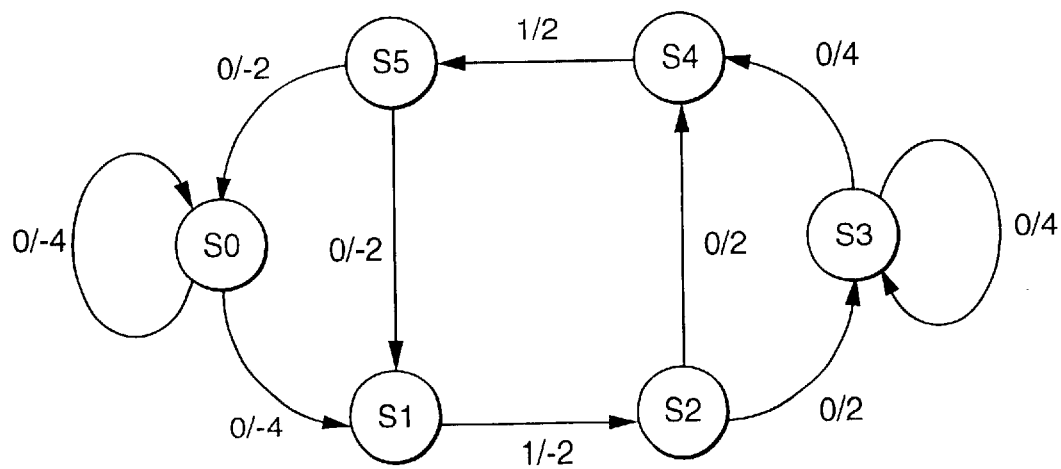
FIG. 9 shows a state transition diagram of four levels of data based on a partial response (1, 2, 1)+a Viterbi decoding method of six states.
Figure 10:
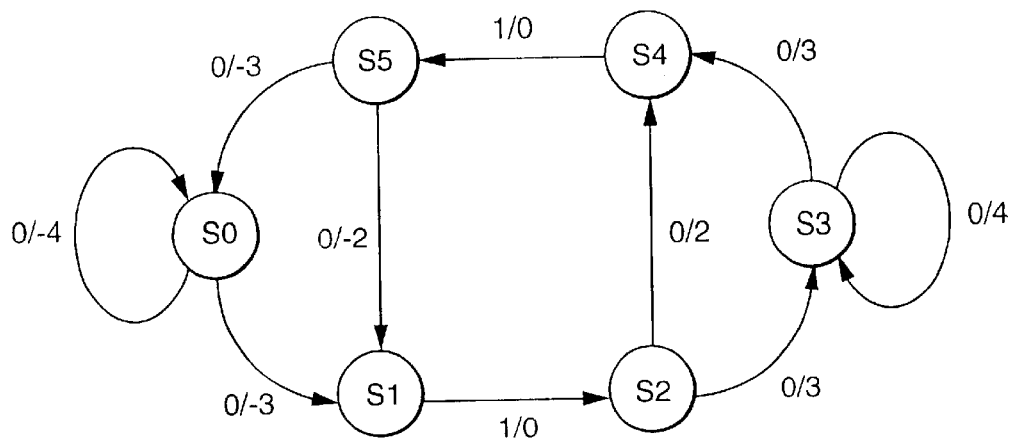
FIG. 10 shows a state transition diagram of seven levels of data based on a partial response (1, 2, 1)+a Viterbi decoding method of six states.
Figure 11:
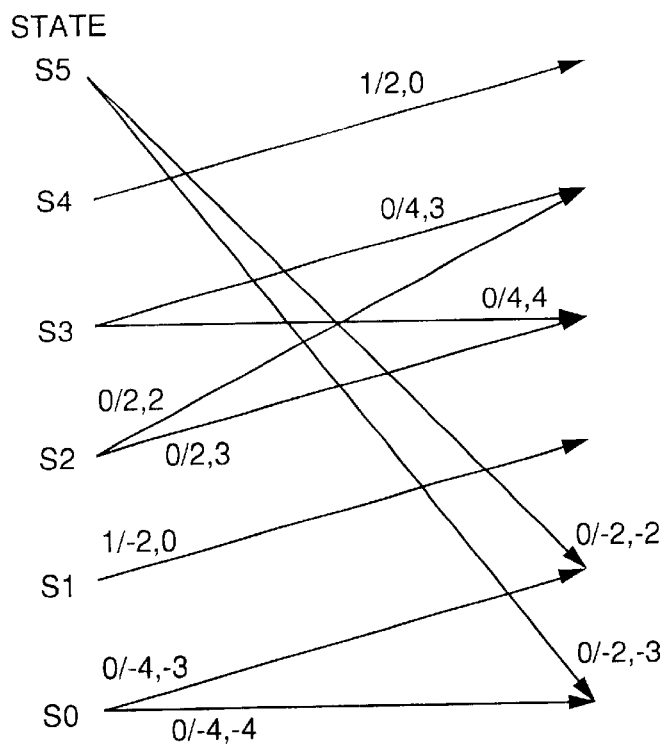
FIG. 11 shows a trellis diagram of four levels/seven levels of data based on a partial response (1, 2, 1)+a Viterbi decoding method of six states.

Next, description is made about the second embodiment of the invention with reference to FIGS. 9 through 11.

In fractional numbers shown in FIG. 9, denominators represent the input data of four levels, and numerators represent output data from a decoder. In fractional numbers shown in FIG. 10, denominators represent the input data of seven levels, and numerators represent output data from a decoder. In fractional numbers shown in FIG. 11, the former numbers in denominators represent the input data of four levels, later numbers in the denominators represent the input data of seven levels, and numerators represent output data from a decoder.

In the second embodiment of the invention, six playback states S0 through state S5 are used. The states S0 through S5 make transition in a manner as shown in FIG. 9 for the data of four levels, and make transition as shown in FIG. 10 for the data of seven levels. In FIG. 11, both the data of the four levels and the data of the seven levels are shown on a trellis diagram which has an abscissa representing a time. Specifically, in the Viterbi decoding method, the following state transition rules are used.

When the four levels of "−4" and the seven levels of "−4" are supplied in a state S0, it makes a transition to a state S0 and provides the value "0" as the decoder's output signal.

When the four levels of "−4" and the seven levels of "−3" are supplied in a state S0, it makes a transition to a state S1 and provides the value "0" as the decoder's output signal.

When the four levels of "−2" and the seven levels of "0" are supplied in a state S1, it makes a transition to a state S2 and provides the value "1" as the decoder's output signal.

When the four levels of "2" and the seven levels of "3" are supplied in a state S2, it makes a transition to a state S2 and provides the value "0" as the decoder's output signal.

When the four levels of "2" and the seven levels of "2" are supplied in a state S2, it makes a transition to a state S4 and provides the value "0" as the decoder's output signal.

When the four levels of "4" and the seven levels of "4" are supplied in a state S3, it makes a transition to a state S3 and provides the value "0" as the decoder's output signal.

When the four levels of "4" and the seven levels of "3" are supplied in a state S3, it makes a transition to a state S4 and provides the value "0" as the decoder's output signal.

When the four levels of "2" and the seven levels of "0" are supplied in a state S4; it makes a transition to a state S5 and provides the value "1" as the decoder's output signal.

When the four levels of "−2" and the seven levels of "−3" are supplied in a state S5, it makes a transition to a state S0 and provides the value "0" as the decoder's output signal.

When the four levels of "−2" and the seven levels of "−2" are supplied in a state S5, it makes a transition to a state S1 and provides the value "0" as the decoder's output signal.

And when the signal violating the above-described state transition rules is inputted, bit error correction is performed by detecting an incorrect state and judging an original state.

Next, more detail description is made.

For the PR(1, 2, 1)+the Viterbi decoding method of six states, let $y_{10}$ be the detected four levels of data. In this case, and $y_{11}$ be the detected seven levels of data, the probabilities that transition from state Sm to state Sn occurs are shown as follows. Herein, $\tau^2$ is a variance, its approximate value is obtained from experiments.

[for the four levels of data $y_{10}$]
probability of transitions S0−>S0, S0−>S1: $\{1/((2\pi\tau^2)^{1/2})\}\cdot\exp\{-(y_{10}+4)^2/(2\tau^2)\}$
probability of transitions S1−>S2, S5−>S0, S5−>S1: $\{1/((2\pi\tau^2)^{1/2})\}\cdot\exp\{-(y_{10}+2)^2/(2\tau^2)\}$
probability of transitions S2−>S3, S2−>S4, S4−>S5: $\{1/((2\pi\tau^2)^{1/2})\}\cdot\exp\{-(y_{10}+2)^2/(2\tau^2)\}$
probability of transitions S3−>S3, S3−>S4: $\{1/((2\pi\tau^2)^{1/2})\}\cdot\exp\{-(y_{10}+4)^2/(2\tau^2)\}$

[for the seven levels of data $y_{11}$]
probability of transitions S0−>S0: $\{1/((2\pi\tau^2)^{1/2})\}\cdot\exp\{-(y_{11}+4)^2/(2\tau^2)\}$
probability of transitions S0−>S1, S5−>S0: $\{1/((2\pi\tau^2)^{1/2})\}\cdot\exp\{-(y_{11}+3)^2/(2\tau^2)\}$
probability of transitions S5−>S1: $\{1/((2\pi\tau^2)^{1/2})\}\cdot\exp\{-(y_{11}+2)^2/(2\tau^2)\}$
probability of transitions S1−>S2, S4−>S5: $\{1/((2\pi\tau^2)^{1/2})\}\cdot\exp\{-(y_{11})^2/(2\tau^2)\}$
probability of transitions S2−>S4: $\{1/((2\pi\tau^2)^{1/2})\}\cdot\exp\{-(y_{11}-2)^2/(2\tau^2)\}$
probability of transitions S2−>S3, S3−>S4: $\{1/((2\pi\tau^2)^{1/2})\}\cdot\exp\{-(y_{11}-3)^2/(2\tau^2)\}$
probability of transitions S3−>S3: $\{1/((2\pi\tau^2)^{1/2})\}\cdot\exp\{-(y_{11}-4)^2/(2\tau^2)\}$ Let a transition metric (branch metric) be a negative logarithm of the probability. Because a relative relationship among the branch metrics is important, the same number may be added to the branch metrics or multiplied by the branch metrics to create more simple expressions. After the simplification, the following metrics are obtained. Further, all the metrics may be divided by two.

[for the four levels of data $y_{10}$]
branch metric of transitions S0−>S0, S0−>S1: $8y_{10}+16$
branch metric of transitions S1−>S2, S5−>S0, S5−>S1: $4y_{10}+4$
branch metric of transitions S2−>S3, S2−>S4, S4−>S5: $-4y_{10}+4$
branch metric of transitions S3−>S3, S3−>S3: $-8y_{10}+16$

[for the seven levels of data $y_{11}$]
branch metric of transitions S0−>S0: $8y_{11}+16$
branch metric of transitions S0−>S1, S5−>S0:>S1: $6y_{11}+9$
branch metric of transitions S5−>S1: $4y_{11}+4$
branch metric of transitions S1−>S2, S4−>S5: 0
branch metric of transitions S2−>S4: $-4y_{11}+4$
branch metric of transitions S2−>S3, S3−>S4: $-6y_{11}+9$
branch metric of transitions S3−>S3: $-8y_{11}+16$ Let each of path metrics $m_n(S5)-m_n(S0)$ be the corresponding negative logarithm of probability during the states S5–S0 at time. And let each of path metrics $m_{n-1}(S5)-m_{n-1}(S0)$ be the corresponding negative logarithm of probability during the states S5–S0 at time n−1.

With referring to FIG. 9, the path metrics for the four levels of data $y_{10}$ are shown as follows.
$m_n(S5)=m_{n-1}(S4)-4y_{10}+4$
$m_n(S4)=\min[m_{n-1}(S2)-4y_{10}+4, m_{n-1}(S3)-8y_{10}+16]$
$m_n(S3)=\min[m_{n-1}(S2)-4y_{10}+4, m_{n-1}(S3)-8y_{10}+16]$
$m_n(S2)=m_{n-1}(S1)+4y_{10}+4$
$m_n(S1)=\min[m_{n-1}(S5)+4y_{10}+4, m_{n-1}(S0)+8y_{10}+16]$
$m_n(S0)=\min[m_{n-1}(S5)-4y_{10}+4, m_{n-1}(S0)+8y_{10}+16]$ With referring to FIG. 10, the path metrics for the seven levels of data $y_{11}$ are shown as follows.
$m_n(S5)=m_{n-1}(S4)$
$m_n(S4)=\min[m_{n-1}(S2)-4y_{11}+4, m_{n-1}(S3)-6y_{10}+9]$
$m_n(S3)=\min[m_{n-1}(S2)-6y_{11}+9, m_{n-1}(S3)-8y_{10}+16]$
$m_n(S2)=m_{n-1}(S1)$
$m_n(S1)=\min[m_{n-1}(S5)+4y_{11}+4, m_{n-1}(S0)+6y_{10}+9]$
$m_n(S0)=\min[m_{n-1}(S5)+6y_{11}+9, m_{n-1}(S0)+8y_{10}+16]$ Herein, using both the four levels of data and the seven levels of data, the following equations are obtained with referring to FIG. 11.

$$m_n(S5)=m_{n-1}(S4)-4y_{10}+4 \qquad (1)$$

(the path transits as shown in FIG. 12A)

$$m_n(S0)=\min[m_{n-1}(S5)-4y_{10}+4-y_{11}4, m_{n-1}(S3)-8y_{10}+16-16y_{11}9] \qquad (2)$$

(the path transits as shown in FIG. 12B) when the first term is selected, and transits as shown in FIG. 12C when the second term is selected)

$$m_n(S3)=\min[m_{n-1}(S2)-4y_{10}+4-6y_{11}+9, m_{n-1}(S3)-8y_{10}+16-8y_{11}+16] \qquad (3)$$

(the path transits as shown in FIG. 12D when the first term is selected, and transits as shown in FIG. 12E when the second term is selected)

$$m_n(S2)=m_{n-1}(S1)+4y_{10}+4 \quad (4)$$

$$m_n(S1)=\min[m_{n-1}(S5)+4y_{10}+4+4y_{11}+4, m_{n-1}(S0)+8y_{10}+16+6y_{11}+9] \quad (5)$$

(the path transits as shown in FIG. 12G when the first term is selected, and transits as shown in FIG. 12H when the second term is selected)

$$m_n(S0)=\min[m_{n-1}(S5)+4y_{10}+4+4y_{11}+4, m_{n-1}(S0)+8y_{10}+16+8y_{11}+16] \quad (6)$$

(the path transits as shown in FIG. 12I when the first term is selected, and transits as shown in FIG. 12J when the second term is selected)

Since the calculations are enough to obtain the relative relationship among the $m_n(S5)-m_n(S0)$, the same number may be added to them or multiplied by them. For example, $m_n(S0)$ may be subtracted from each of the $m_n(S5)-m_n(S0)$ to produce new $m_n(S5)-m_n(S0)$. In this case, the new $m_n(S0)$ is "0".

In the embodiment of the invention, the four levels/the seven levels of data are weighted and the playback data is determined. This is because the importance of the four levels of data and the seven levels of data may be different from each other according to characteristics of recording/playback or recording medium. To weight each of the four levels/the seven levels of data, an error rate will be further decreased. The actual optimal weight may be determined by some experiments.

Herein, let w be an weight coefficient of the four levels of data. Then, weight coefficient of the seven levels of data is 1−w, the following equations are determined.

$$m_n(S5)=m_{n-1}(S4)+w(-4y_{10}+4) \quad (1)$$

(the path transits as shown in FIG. 12A)

$$m_n(S4)=\min[m_{n-1}(S2)+w(-4y_{10}+4)+(1-w)(-4y_{11}+4), m_{n-1}(S3)+w(-8y_{10}+16)+(1-w)(-6y_{11}+9)] \quad (2)$$

(the path transits as shown in FIG. 12B when the first term is selected, and transits as shown in FIG. 12C when the second term is selected)

$$m_n(S3)=\min[m_{n-1}(S2)+w(-4y_{10}+4)+(1-w)(-6y_{11}+9), m_{n-1}(S3)+w(-8y_{10}+16)+(1-w)(-8y_{11}+16)] \quad (3)$$

(the path transits as shown in FIG. 12D when the first term is selected, and transits as shown in FIG. 12E when the second term is selected)

$$m_n(S1)=m_{n-1}(S1)+w(4y_{10}+4) \quad (4)$$

(the path transits as shown in FIG. 12F)

$$m_n(S1)=\min[m_{n-1}(S5)+w(4y_{10}+4)+(1-w)(4y_{11}+4), m_{n-1}(S0)+w(8y_{10}+16)+(1-w)(6y_{11}+9)] \quad (5)$$

(the path transits as shown in FIG. 12G when the first term is selected, and transits as shown in FIG. 12H when the second term is selected)

$$m_n(S0)=\min[m_{-1}(S5)+w(4y_{10}+4)+(1-w)(6y_{11}+9), m_{-1}(S0)+w(8y_{10}+16)+(1-w)(8y_{11}+16)] \quad (6)$$

(the path transits as shown in FIG. 12I when the first term is selected, and transits as shown in FIG. 12J when the second term is selected)

Since the calculations are enough to obtain the relative relationship among the $m_n(S5)-m_n(S0)$, the same number may be added to them or multiplied by them. For example, $m_n(S0)$ may be subtracted from each of the $m_n(S5)-m_n(S0)$ to produce new $m_n(S5)-m_n(S0)$. In this case, the new $m_n(S0)$ is "0".

The above example, the weight coefficient w is applied to the four levels of data and the weight coefficient 1−w is applied to the seven levels of data. However, the weight coefficient w may be applied to the seven levels of data and the weight coefficient 1−w may be applied to the four levels of data.

Also, according to characteristics of recording playback and recording medium, the importance of the four levels the seven levels of data may be different for each level. Then, preparing two kinds of weight coefficients w0, w1, when data level of the four levels (or seven levels) of data exceeds (or equal to) a predetermined threshold value L, w0 may be assigned as the weight coefficient, and when data level of the four levels (or seven levels) of data is less than or equal to the threshold value L, w1 is assigned as the weight coefficient. To do this, error rate will be further decreased. The actual optimal weight coefficient and the threshold value may be determined by some experiments.

For example, let the threshold value L be −0.2, w0 be 0.375, and w1 be 0.75. Herein, if the four levels of data should be controlled, the four levels and the seven levels of data are shown as follows.

The four levels of data; −0.8, −0.7, 0.1, 0.6, 0.3, −0.6
The seven levels of data; −0.7, −0.4, 0.3, 0.5, −0.4, −0.9

As a result, w0 is assigned to w when the four levels of data exceeds to the threshold value L, and w1 is assigned to w when the four levels of data is less than the threshold value L. Therefore, value of w transits as follows; 0.75, 0.75, 0.375, 0.375, 0.375, 0.75.

As described above, $m_n(S5)-m_n(S0)$ are calculated according to (1)–(6), paths of state transition are determined as shown in FIGS. 12A–12J (hereafter may be called (a)–(j), respectively, for convenience of description), and the determined paths are arranged.

Next, description is made about the paths of state transition. For the above-described (1)–(6), (a) is always selected at (1), (f) is always selected at (4), (b) or (c) is selected at (2), (d) or (e) is selected at (3), (g) or (h) is selected at (5), and (i) or (j) is selected at (6). In this case, for example, when (c) is selected at (2), (d) is selected at (3), (g) is selected at (5), and (j) is selected at (6) at time (n), (a), (c), (d), (f), (g) and (j) are selected by gathering (1)–(6). Herein, six paths, (a)S4−>S5, (c)S3−>S4, (d)S2−>S3, (f)S1−>S2, (g)S5−>S1 and (j)S0−>S0, are selected from time n−1 to time n.

Hereinafter, six paths of state transition are selected for each time, and the paths are arranged.

Figure 13:
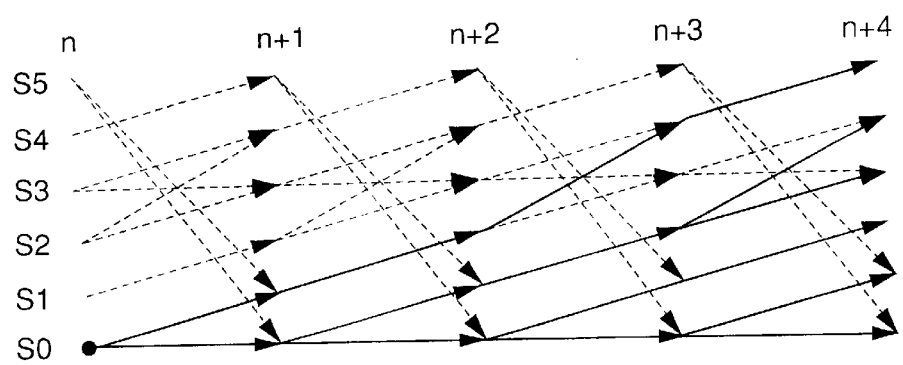
FIG. 13 shows a diagram for the purpose of illustrating path merge based on a partial response (1, 2, 1)+a Viterbi decoding method of six states.

Next, determination of path merge is performed. Example of the determination is shown in FIG. 13.

If (5):(h), (6):(j) are selected at time (n+1), (5):(h), (6):(j) are selected at time (n+2), (2):(b), (5):(h), (6):(j) are selected at time (n+3), and (2):(b), (3):(d), (5):(h), (6):(j) are selected at time (n+4), it is found that paths are connected into S0(•) at time n by going back the selected paths from the all states at time (n+4). This is referred to as gathering of paths into a point, in other words, "path merge". When the path merge occurred, former paths are determined from a point(•) to which the paths are gathered, and former data are determined using numerators of fractional numbers shown in FIG. 11.

Figure 14:
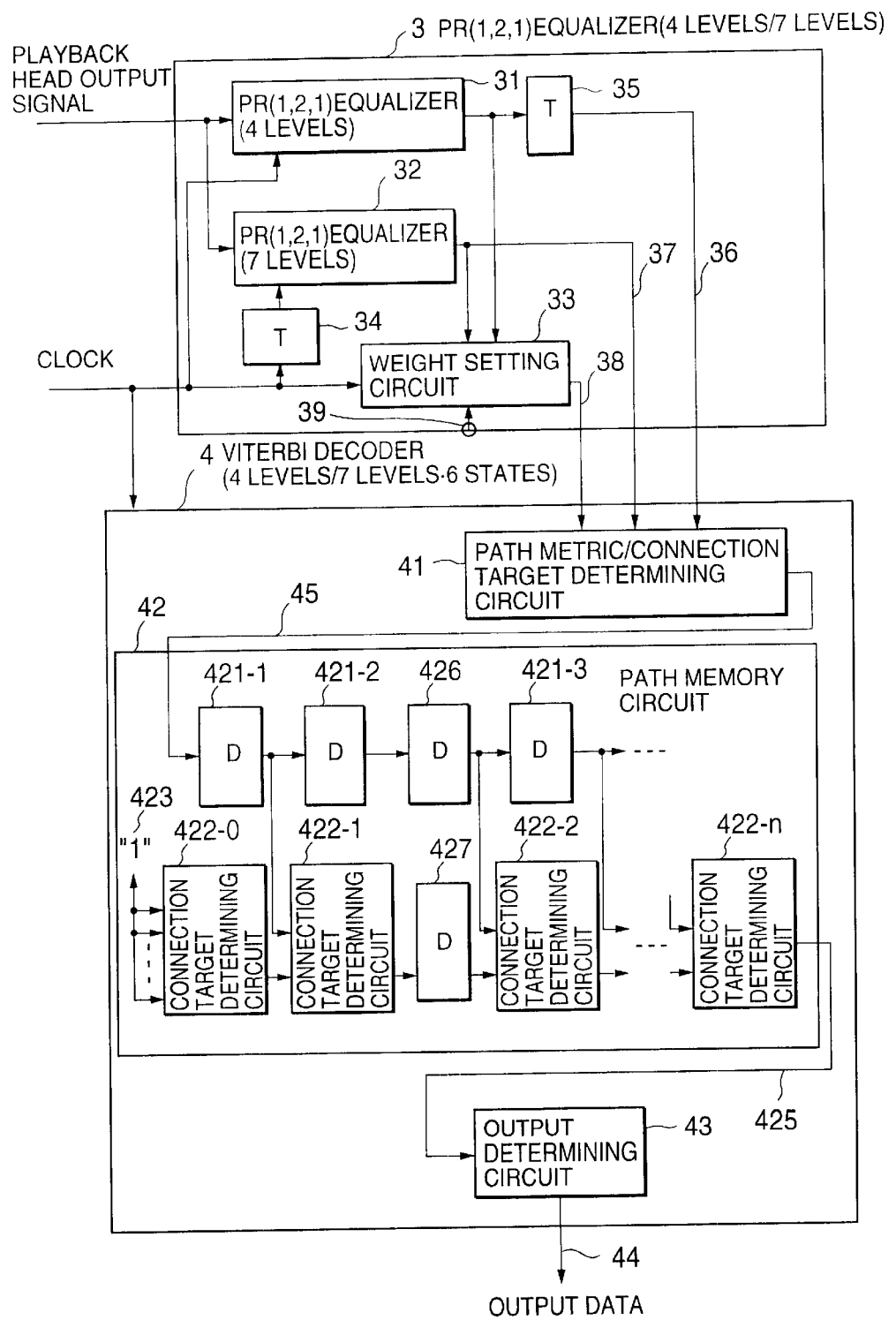
FIG. 14 shows a block diagram of another embodiment of a playback data detecting device according to the invention.

FIG. 14 shows a block diagram of a playback data detecting device which performs the above-mentioned method. The playback detecting device includes a PR(1, 2, 1) equalizer 3 which provides two types of data, namely, four levels of data and the ten levels of data, and a Viterbi decoder 4 with four levels seven levels and six states.

The PR(1, 2, 1) equalizer 3 is given output signals which are detected, for example, by a playback head. In this case, output may be, for example, recorded data recorded as a recorded code which has a minimum inverse metric of at least two. The PR(1, 2, 1) equalizer 3 then converts the signals into four levels of data and seven levels of data which resides in the intermediate time point between the four levels of data by carrying out partial response (1, 2, 1) detection by using intersymbol correlation. Thereafter, the PR(1, 2, 1) equalizer 3 supplies the four levels of data 36 and seven levels of data 37 to the Viterbi decoder 4.

Such an equalizer 3, for example, may include a PR(1, 2, 1) equalizer 31 which converts the playback head signals into the four levels of data, and a PR(1, 2, 1) equalizer 32 which converts the signals into the seven levels of data as shown in FIG. 14. In this case, operation clock signal may be delayed by a half a clock cycle by a delay circuit 34 and may be thereafter supplied to the PR(1, 2, 1) equalizer 32. Consequently, the PR(1, 2, 1) equalizer 32 can perform conversion of the seven levels of data which resides in the intermediate time point between the four levels of data. Also, since the four levels of data detected by the PR(1, 2, 1) equalizer 31 and the seven levels of data detected by the PR(1, 2, 1) equalizer 32 after a half clock cycle is past are provided in pair, output timing of PR(1, 2, 1) equalizer 31 is delayed a half clock cycle by a delay circuit 35 to match output timing of the four levels of data 36 to the Viterbi decoder 4 with output timing of the seven levels of data 37 to the Viterbi decoder 4.

Further, the equalizer 3 includes a weight setting circuit 33 which sets a weight coefficient w to the four levels of data or the seven levels of data. The weight coefficient 38 is supplied from the weight setting circuit 33 to the Viterbi decoder 4. A setting terminal 39 is connected to the weight setting circuit 33. The weight setting circuit 33 may select the value of the weight coefficient 38 or operation mode according to data given from the setting terminal 39. In other words, the weight coefficient and the operation mode can be selected in the following manner in response to the data given from the setting terminal 39 to the weight setting circuit 33.

(a) The weight coefficient w is always kept at a constant value.

(b) The two weight coefficients w0 and w1 are indicated together with a threshold value L to the four levels of data. Herein, when the level of the four levels of data from the PR(1, 2, 1) equalizer 31 is not smaller than (namely, larger than or equal to) the threshold value L, w0 is supplied as the weight coefficient to the four levels of data from the PR(1, 2, 1) equalizer 31 for each clock cycle. When the level of the four levels of data is not greater than (namely, less than or equal to) the threshold value L, w1 is supplied as the weight coefficient to the four levels of data from the PR(1, 2, 1) equalizer 31 for each clock cycle.

(c) The two weight coefficients w0 and w1 are indicated together with a threshold value L to the seven levels of data. Herein, when the level of the seven levels of data from the PR(1, 2, 1) equalizer 32 is not smaller than (namely, larger than or equal to) the threshold value L, w0 is supplied as the weight coefficient to the seven levels of data from the PR(1, 2, 1) equalizer 32 for each clock cycle. When the level of the seven levels of data is not greater than (namely, less than or equal to) the threshold value L, w1 is supplied as the weight coefficient to the seven levels of data from the PR(1, 2, 1) equalizer 32 for each clock cycle.

The embodiment of the invention may be employed which does not set such an weight coefficient w to the four levels of data or the seven levels of data.

Responsive to the four levels of data 36, the seven L levels of data 37, and the weight coefficient 38 from the PR(1, 2, 1) equalizer 3 for each clock cycle, the Viterbi decoder 4 performs Viterbi decoding operation according to a predetermined state transition rules to produce an output data 44. In the illustrated example, the Viterbi decoder 4 includes a path metric/connection target determining circuit 41, a path memory circuit 42, and an output determining circuit 43.

The path metric/connection target determining circuit 41 determines $m_n(S5)-m_n(S0)$ based on the four levels of data 36 ($y_{10}$), the seven levels of data 37 ($y_{11}$), $m_{n-1}(S5)-m_{n-1}(S0)$, and the weight coefficient 38, and determines a connection target which is connected at a previous time point before one clock cycle from the present time point for each of states S4, S3, S1 and S0. The determining circuit 41 provides the results to the path memory circuit 42 as connection target data 45. In this event, the connection target data 45 includes "0" when S4 at the present time point is connected to S2 at the previous time point before one clock cycle from the present time point, and includes "1" when S4 at the present time point is connected to S3 at the previous time point before one clock cycle from the present time point. Further, the connection target data 45 includes "0" when S3 at the present time point is connected to S2 at the previous time point before one clock cycle from the present time point, and includes "1" when S3 at the present time point is connected to S3 at the previous time point before one clock cycle from the present time point. 9 And further, the connection target data 45 includes "0" when S5 at the present time point is connected to S5 at the previous time point before one clock cycle from the present time point, and includes "1" when S5 at the present time point is connected to S0 at the previous time point before one clock cycle from the present time point. Still further, the connection target data 45 includes "0" when S0 at the present time point is connected to S5 at the previous time point before one clock cycle from the present time point, and includes "1" when S0 at the present time point is connected to S0 at the previous time point before one clock cycle from the present time point.

Each data is represented by four bits corresponding to S4, S3, S1 and S0.

The path memory circuit 42 stores the connection target data 45 at every clock cycle and keep the target data over several steps (clock cycles) and examines about a sequence of the target data and selects a single one of paths (path merge) based on the connection target data 45.

The path memory circuit 42 includes data latches (for example, D-type flip flops) 421-1, 421-2, 421-3, ... each of which stores the connection target data 45 over several tens of stages (clock cycles). The current data is supplied to the data latch which resides in the leftmost one of the data latches and is successively delayed or sifted rightwards of FIG. 7. Therefore, as the data latches go rightwards older data is stored in the data latches. Also, for each steps of the data latches, the connection target determining circuits 422-1, 422-2, ..., 422-n are connected, and the connection target determining circuit 422-0 may be considered to be connected to a zeroth step of the data latches.

The connection target determining circuit 422-0 for the zeroth step receives data 423 in which all bits are "1" as initial value. The circuit 422-0 provides output data 424 composed of the bits which are in one-to-one correspondence to the states S0–S5 and which take "1" to specify any one of the states S0–S5 in the next clock cycle.

Each of the connection target determining circuits 422-1, 422-2, ..., 422-n for the steps after the zeroth step receives four bits of output data from a previous step of the connection target determining circuit and the connection target data 45 from the data latch which corresponds to the step. Under the circumstances, each determining circuit determines, for each states S0–S5, whether or not the state may be selected and, sets "1" to the bit which corresponds to the state if the state may be selected. On the other hand, the determining circuit sets "0" to the bit which corresponds to the state if the state may not be selected, and sends the resulting bits to another connection target determining circuit for the next step. Therefore, for each of the states S5, S4, S3, S2, S1, and S0, the connection target to which the path is connected at a time point before one clock cycle from the present time point is determined based on the following elements.

(1) The received four bits of data from the data latch which corresponds to the step.
(2) Whether the connection at the next clock cycle is performed or not is determined based on the received four bits from the connection target determining circuit for the former step.
(3) Four bits of data which represents the path may be connected at a time point before one clock cycle from the present time point is sent to the connection target determining circuit for the next step.

Specifically, description will be made about state S5. If the connection to S5 is made one clock after in response to an output sent from a previous one of the determining circuit, the bit which corresponds to S4 of the output supplied to the next one of the determining circuit is set into "1".

As to the state S4, when the connection at the next clock cycle is performed in response to an output from the connection target determining circuit for the former step and when data which corresponds to state S4 from data latch which corresponds to the step is "0", "1" is set to the bit, which corresponds to the state S2 included in an output to the connection target determining circuit for the next step. On the other hand, when data which corresponds to state S4 from data latch which corresponds to the step is "1", "1" is set to the bit, which corresponds to the state S3, in an output to the connection target determining circuit for the next step.

For state S3, when the connection at the next clock cycle is performed in response to an output from the connection target determining circuit for the former step and when data which corresponds to state S3 from data latch which corresponds to the step is "0", "1" is set to the bit, which corresponds to the state S2 included in an output to the connection target determining circuit for the next step. On the other hand, when data which corresponds to state S3 from data latch which corresponds to the step is "1", "1" is set to the bit, which corresponds to the state S3, in an output to the connection target determining circuit for the next step.

For state S2, when the connection at the next clock cycle is performed in response to an output from the connection target determining circuit for the former step, "1" is set to the bit, which corresponds to the state S1 included in an output to the connection target determining circuit for the next step.

For state S1, when the connection at the next clock cycle is performed in response to an output from the connection target determining circuit for the former step and when data which corresponds to state S1 from data latch which corresponds to the step is "0", "1" is set to the bit, which corresponds to the state S5 included in an output to the connection target determining circuit for the next step. On the other hand, when data which corresponds to state S1 from data latch which corresponds to the step is "1", "1" is set to the bit, which corresponds to the state S0, in an output to the connection target determining circuit for the next step.

For state S0, when the connection at the next clock cycle is performed in response to an output from the connection target determining circuit for the former step and when data which corresponds to state S0 from data latch which corresponds to the step is "0", "1" is set to the bit, which corresponds to the state S5 included in an output to the connection target determining circuit for the next step. On the other hand, when data which corresponds to state S0 from data latch which corresponds to the step is "1", "1" is set to the bit, which corresponds to the state S0, in an output to the connection target determining circuit for the next step.

In any case, when "1" is not set to a bit, the value of the bit is "0".

As described above, by using multiple connections of the connection target determining circuits 422-0, 422-1, ..., 422-n, the states to which the path may be connected are limited or decreased as the steps proceed, that is, as are returned back to the past clock cycle. Finally, paths are merged with a single path, and thus, path merge is carried out.

An output 425 of the path memory circuit 42 is obtained from the connection target determining circuit for the last step 422-n, and is configured by six bits which correspond to S0, S1, S2, S3, S4, S5, and S6 one by one. The output 425 is set to "1" when the path may be connected to any of states S0–S5, and is set to "0" when the path may not be connected. Herein, when the path merge is performed, one bit of the six bits is set to "1" and the other bits are set to "0".

Data latches 426 and 427 in the path memory circuit 42 shown in FIG. 14 have timing adjust functions to prevent hardware malfunction which occurs when the delay time exceeds a clock cycle due to multiple connections.

An output calculating circuit 43 determines an output data 44 from a path which is uniquely determined from the output 425 of the path memory circuit 42. Herein, the output data 44 is obtained based on the numerators of the fractional numbers shown in FIG. 4.

When the path merge is not performed, that is, there are at least two bits including value "1" in the six bits of output 425, the number of paths (bits) which corresponds to the output data "0" in the output 425 is compared with the number of paths (bits) which corresponds to the output data "1" in the output 425. If the former number is larger than the later, the output is "0", and otherwise, the output is

[Third embodiment of the invention]

In the embodiment of the invention, a method of the invention is applied to a playback data detecting device which detects playback data which has the continuous non-inverse bits of at least two and performs, on a receiving side, a partial response (1, 2, 2, 1) equalization method, to decode the playback data by a Viterbi decoding method of ten states.

Figure 15:
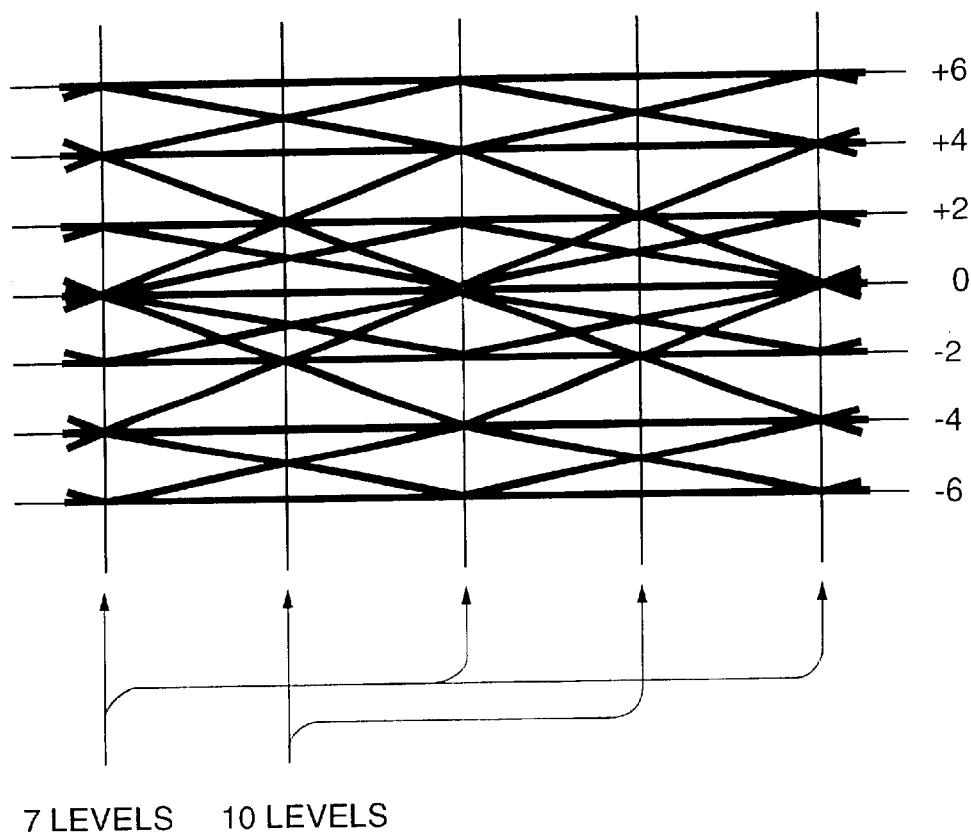
FIG. 15 shows a graph representing a series of an eye pattern of playback waveform based on a partial response (1, 2, 2, 1)

With the partial response (1, 2, 2, 1), a waveform recorded as "1" is played back or reproduce as "1221". Also, the partial response (1, 2, 2, 1) playbacks a signal as a waveform "13431", which is formed by adding "12210" and "01221", when the signal is recorded as "11". When these waveforms are superposed on each other and equally distributed to a plus (+) region and a minus (−) region, it is possible to obtain an eye pattern as shown in FIG. 15. Taking this into consideration, a playback signal is converted into seven levels by the partial response PR(1, 2, 2, 1) detecting technique using the intersymbol correlation on a playback or a reproduction side. Further, the seven levels, and ten levels which reside in the intermediate points between the seven levels in time are used as data.

Figure 16:
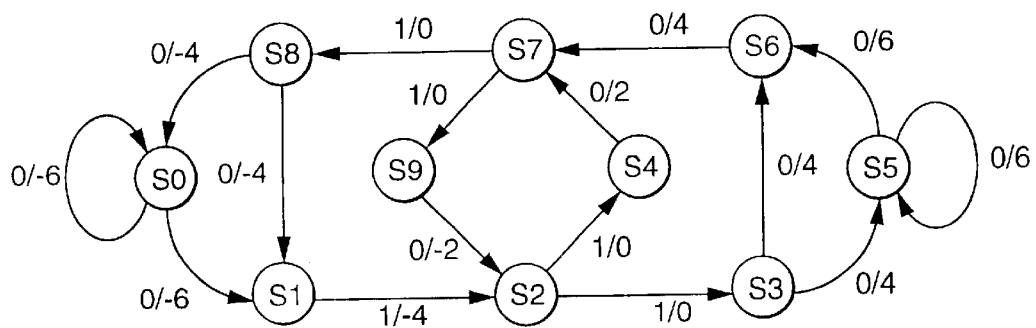
FIG. 16 shows a state transition diagram of seven levels of data based on a partial response (1, 2, 2, 1)+a Viterbi decoding method of ten states.
Figure 17:
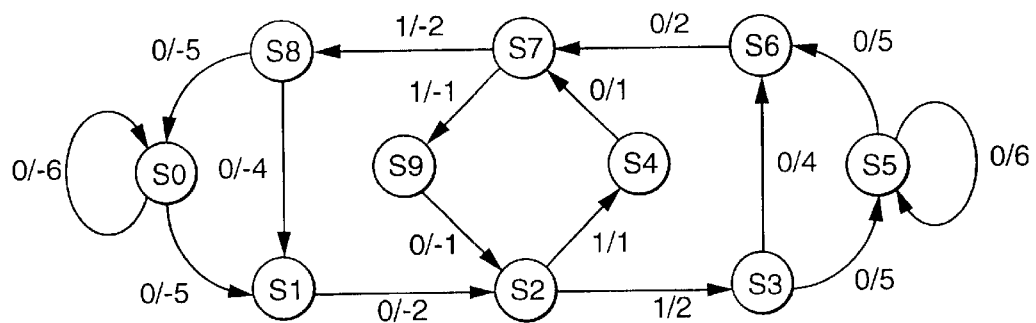
FIG. 17 shows a state transition diagram of ten levels of data based on a partial response (1, 2, 2, 2)+a Viterbi decoding method of ten states.
Figure 18:
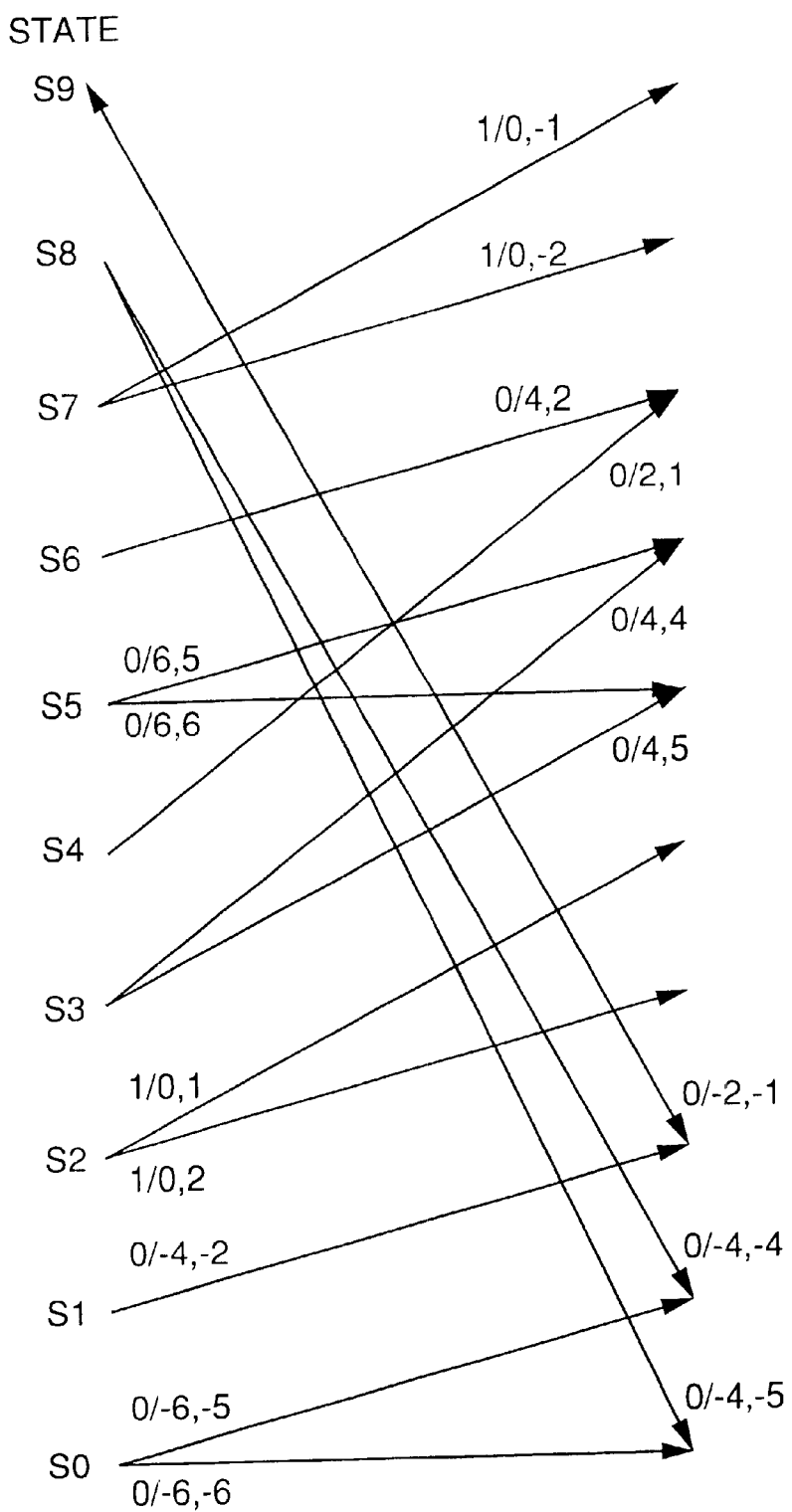
FIG. 18 shows a trellis diagram of seven levels/ten levels of data based on a partial response (1, 2, 2, 2)+a Viterbi decoding method of ten states.

Next, description is made about the third embodiment of the invention with reference to FIGS. 16 through 18.

In fractional numbers shown in FIG. 16, denominators represent the input data of seven levels, and numerators represent output data from a decoder. In fractional numbers shown in FIG. 17, denominators represent the input data of ten levels, and numerators represent output data from a decoder. In fractional numbers shown in FIG. 18, the former numbers in denominators represent the input data of seven levels, later numbers in the denominators represent the input data of ten levels, and numerators represent output data from a decoder.

In the third embodiment of the invention, ten playback states S0 through state S9 are used. The states S0 through S9 make transition in a manner as shown in FIG. 16 for the data of seven levels, and make transition, as shown in FIG. 17 for the data of ten levels. In FIG. 18, both the data of the seven levels and the ten levels are shown on a trellis diagram which has an abscissa representing a time. Specifically, in the Viterbi decoding method, the following state transition rules are used.

When the seven levels of "−6" and the ten levels of "−6" are input in a state S0, it makes a transition to a state S0 and provides the value "0" as the decoder's output signal.

When the seven levels of "−6" and the ten levels of "−5" are input in the state S0, it makes a transition to a state S1 and provides the value "0" as the decoder's output signal.

When the seven levels of "−4" and the ten levels of "−2", are input in the state S1, it makes a transition to a state S2 and provides the value "0" as the decoder's output signal.

When the seven levels of "0" and the ten levels of "2" are input in the state S2, it makes a transition to a state S3 and provides the value "1" as the decoder's output signal.

When the seven levels of "0" and the ten levels of "1" are input in the state S2, it makes a transition to a state S4 and provides the value "1" as the decoder's output signal.

When the seven levels of "4" and the ten levels of "5" are input in the state S3, it makes a transition to a state S5 and provides the value "0" as the decoder's output signal.

When the seven levels of "4" and the ten levels of "4" are input in the state S3, it makes a transition to a state S6 and provides the value "0" as the decoder's output signal.

When the seven levels of "2" and the ten levels of "1" are input in the state S4, it makes a transition to a state S7 and provides the value "0" as the decoder's output signal.

When the seven levels of "6" and the ten levels of "6" are input in the state S5, it makes a transition to a state S5 and provides the value "0" as the decoder's output signal.

When the seven levels of "6" and the ten levels of "5" are input in the state S5, it makes a transition to a state S6 and provides the value "0" as the decoder's output signal.

When the seven levels of "4" and the ten levels of "2" are input in the state S6, it makes a transition to a state S7 and provides the value "0" as the decoder's output signal.

When the seven levels of "0" and the ten levels of "−2" are input in the state S7, it makes a transition to a state S8 and provides the value "1" as the decoder's output signal.

When the seven levels of "4" and the ten levels of "−1" are input in the state S7, it makes a transition to a state S9 and provides the value "1" as the decoder's output signal.

When the seven levels of "−4" and the ten levels of "−5" are input in the state S0, it makes a transition to a state S6 and provides the value "0" as the decoder's output signal.

When the seven levels of "−4" and the ten levels of "−4" are input in the state 98, it makes a transition to a state S1 and provides the value "0" as the decoder's output signal.

When the seven levels of "−2" an d the ten levels of "−1" are input in the state S9, it makes a transition to a state S2 and provides the value "0" as the decoder's output signal.

And when the signal violating the above-described state transition rules is inputted, bit error correction is performed by detecting an incorrect state and judging an original state.

Next, more detail description is made.

For the PR(1, 2, 2, 1)+the Viterbi decoding method of ten states, let $y_{20}$ be the detected seven levels of data, and $y_{21}$ be the detected ten levels of data. In this case, the probabilities that transition from state Sm to state Sn occurs are shown as follows. Herein, $\tau^2$ is a variance, its approximate value is obtained from experiments.

[for the seven levels of data $y_{20}$]

probability of transitions S0−>S0, S0−>S1: $\{1/(2\pi\tau^2)^{1/2})\}\cdot\exp\{y_{20}+6)^2/(2\tau^2)\}$ probability of transitions S1−>S2, S8−>S0, S8−>S1: $\{1/((2\pi\tau^2)^{1/2})\}\cdot\exp\{-(y_{20}+4)^2/(2\tau^2)\}$ probability of transitions S9−>S2: $\{1/((2\pi\tau^2)^{1/2})\}\cdot\exp\{-(y_{20}+2)^2/(2\tau^2)\}$ probability of transitions S2−>S3, S2−>S4, S7−>S8, S7−>S9: $\{1/((2\pi\tau^2)^{1/2})\}\cdot\exp\{-(y_{20})^2/(2\tau^2)\}$ probability of transitions S4−>S7: $\{1/((2\pi\tau^2)^{1/2})\}\cdot\exp\{-(y_{20}-2)^2/(2\pi\tau)\}$ probability of transitions S3−>S5, S3−>S6, S6−>S7: $\{1/((\pi\tau^2)^{1/2})\}\cdot\exp\{(y_{20}4)^2/(2\tau^2)\}$ probability of transitions S5−>S5, S5−>S6: $\{1/((2\pi\tau^2)^{1/2})\}\cdot\exp\{-(y_{20}-6)^2/(2\tau^2)\}$

[for the ten levels of data $y_{21}$]

probability of transitions S0−>S0: $\{1/((2\pi\tau^2)^{1/2})\}\cdot\exp\{-(y_{21}+6)^2/(2\tau^2)\}$ probability of transitions S0−>S1, S8−>S0: $\{1/((2\pi\tau^2)^{1/2})\}\cdot\exp\{-(y_{21}+5)^2/(2\tau^2)\}$ probability of transitions S8−>S1: $\{1/((2\pi\tau^2)^{1/2})\}\cdot\exp\{-(y_{21}+4)^2/(2\tau^2)\}$ probability of transitions S1−>S2, S7−>S8: $\{1/((2\pi\tau^2)^{1/2})\}\cdot\exp\{-(y_{21}+2)^2/(2\tau^2)\}$ probability of transitions S7−>S9, S9−>S2: $\{1/((2\pi\tau^2)^{1/2})\}\cdot\exp\{-(y_{21}+1)^2/(2\tau^2)\}$ probability of transitions S2−>S4, S4−>S7: $\{1/((2\pi\tau^2)^{1/2})\}\cdot\exp\{-(y_{21}-1)^2/(2\tau^2)\}$ probability of transitions S2−>S3, S6−>S7: $\{1/((2\pi\tau^2)^{1/2})\}\cdot\exp\{-(y_{21}-2)^2/(2\tau^2)\}$ probability of transitions S3−>S6: $\{1/((2\pi\tau^2)^{1/2})\}\cdot\exp\{-(y_{21}-4)^2/(2\tau^2)\}$ probability of transitions S3−>S5, S5−>S6: $\{1/((2\pi\tau^2)^{1/2})\}\cdot\exp\{-(y_{21}-5)^2/(2\tau^2)\}$ probability of transitions S5−>S5: $\{1/((2\pi\tau^2)^{1/2})\}\cdot\exp\{-(y_2-6)^2/(2\tau^2)\}$ Let a transition metric (branch metric) be a negative logarithm of the probability. Because a relative relationship among the branch metrics is important, the same number may be added to the branch metrics or multiplied by the branch metrics to create more simple expressions. After the simplification, the following metrics are obtained. Further, all the metrics may be divided by two.

[for the seven levels of data $y_{20}$]

branch metric of transitions S0−>S0, S0−>S1: $12y_{20}+36$ branch metric of transitions S1−>S2, S8−>S0, S8−>S1: $8y_{20}+16$ branch metric of transitions S9−>S2: $4y_{20}+4$ branch metric of transitions S2->S3, S2->S4, S7->S8, S7->S9: 0 branch metric of transitions S4->S7 $-4y_{20}+4$ branch metric of transitions S3->S5, S3->S6, S6 ->S7: $8y_{20}+16$ branch metric of transitions S5->S5, S5->S6: $-12y_{20}+36$

[for the ten levels of data $y_{21}$]

branch metric of transitions S0 S0: $12y_{21}+36$ branch metric of transitions S0->S1, S8->S0: $10y_{21}+25$ branch metric of transitions S8->S1: $8y_{21}+16$ branch metric of transitions S1->S2, S7->S8: $4y_{21}+4$ branch metric of transitions S7->S9, S9->S2: $2y_{21}+1$ branch metric of transitions S2->S4, S4->S7: $2y_{21}+1$ branch metric of transitions S2->S3, S6->S7: $-4y_{21}+4$ branch metric of transitions S3->S6: $-8y_{21}+16$ branch metric of transitions S3->S5, S5->S6: $10y_{21}+25$ branch metric of transitions S5->S5: $-12y_{21}+36$ Let each of path metrics $m_n(S9)-m_n(S0)$ be the corresponding negative logarithm of probability during the states S9-S0 at time n. And let each of path metrics $m_{n-1}(S9)-m_{n-1}(S0)$ be the corresponding negative logarithm of probability during the states S9-S0 at time n-1.

With referring to FIG. 16, the path metrics for the seven levels of data $y_{20}$ are shown as follows.

$m_n(S9)=m_{n-1}(S7)$ $m_n(S8)=m_{n-1}(S7)$ $m_n(S7)=\min[m_{n-1}(S4)-4y_{20}+4, m_{n-1}(S6)-8y_{20}+16]$ $m_n(S6)=\min[m_{n-1}(S3)-8y_{20}+16, m_{n-1}(S5)-12y_{20}+36]$ $m_n(S5)=\min[m_{n-1}(S3)-8y_{20}+16, m_{n-1}(S5)-12y_{20}+36]$ $m_n(S4)=m_{n-1}(S2)$ $m_n(S3)=m_{n-1}(S2)$ $m_n(S2)=\min[m_{n-1}(S9)+4y_{20}+4, m_{n-1}(S1)+8y_{20}+16]$ $m_n(S1)=\min[m_{n-1}(S8)+8y_{20}+16, m_{n-1}(S0)+12y_{20}+36]$ $m_n(S0)=\min[m_1(S8)+8y_{10}+16, m_{n-1}(S0)+12y_{20}+36]$ With referring to FIG. 17, the path metrics for the ten levels of data $Y2_1$ are shown as follows.

$m_n(S9)=m_{n-1}(S7)+2y_{21}+1$ $m_n(S8)=m_{n-1}(S7)+4y_{21}+4$ $m_n(S7)=\min[m_{n-1}(S4)-2y_{21}+1, m_{n-1}(S6)-4y_{21}+4]$ $m_n(S6)=\min[m_{n-1}(S3)-8y_{21}+16, m_{n-1}(S5)-10_{21}+25]$ $m_n(S5)=\min[m_{n-1}(S3)-10y_{21}+25, m_{-1}(S5)-12y_{21}+36]$ $m_n(S4)=m_{n-1}(S2)-2y_{21}+1$ $m_n(S3)=m_{n-1}(S2)-4y_{21}+4$ $m_n(S2)=\min[m_{n-1}(S9)+2y_{21}+1, m_{n-1}(S1)+4y_{21}+4]$ $m_n(S1)=\min[m_{n-1}(S8)+8y_{21}+16, m_{n-1}(S0)+10y_{21}+25]$ $m_n(S0)=\min[m_{n-1}(S8)+10y_{21}+25, m_{n-1}(S0)+12y_{21}+36]$ Herein, using both the seven levels of data and the ten levels of data, the following equations are obtained with referring to FIG. 18.

$$m_n(S9)=m_{n-1}(S7)+2y_{21}+1 \quad (1)$$

(the path transits as shown in FIG. 19A)

$$m_n(S8)=m_{n-1}(S7)+4y_{21}+4 \quad (2)$$

(the path transits as shown in FIG. 19B)

$$m_n(S7)=\min[m_{n-1}(S4)-4y_{20}+4-2y_{21}+1, m_{n-1}(S6)-8y_{20}+16-4y_{21}+4] \quad (3)$$

(the path transits as shown in FIG. 19C when the first term is selected, and transits as shown in FIG. 19D when the second term is selected)

$$m_n(S6)=\min[m_{n-1}(S3)-8y_{20}+16-8y_{21}+16, m_{n-1}(S5)-12y_{20}+36-10y_{21}+25] \quad (40)$$

(the path transits as shown in FIG. 19E when the first term is selected, and transits as shown in FIG. 19F when the second term is selected)

$$m_n(S5)=\min[m_{n-1}(S3)-8y_{20}+16-10y_{21}+25, m_{n-1}(S5)-12y_{20}+36-12y_{21}+36] \quad (5)$$

(the path transits as shown in FIG. 19G when the first term is selected, and transits as shown in FIG. 19H when the second term is selected)

$$m_n(S4)=m_{n-1}(S2)-2y_{21}+1 \quad (6)$$

(the path transits as shown in FIG. 19I)

$$m_n(S3)=m_{n-1}(S2)-4y_{21}+4 \quad (7)$$

(the path transits as shown in FIG. 19J)

$$m_n(S2)=\min[m_{n-1}(S9)+4y_{20}+4+2y_{21}+1, m_{n-1}(S1)+8y_{20}+16+4y_{21}+4] \quad (8)$$

(the path transits as shown in FIG. 19K when the first term is selected, and transits as shown in FIG. 19L when the second term is selected)

$$m_n(S1)=\min[m_{n-1}(S8)+8y_{20}+16+8y_{21}+16, m_{n-1}(S0)+12y_{20}+36+10y_{21}+25] \quad (9)$$

(the path transits as shown in FIG. 19M when the first term is selected, and transits as shown in FIG. 19N when the second term is selected)

$$m_n(S0)=\min[m_{n-1}(S8)+8y_{20}+16+10y_{21}+25, m_{n-1}(S0)+12y_{20}+36+12y_{21}+36] \quad (10)$$

(the path transits: as shown in FIG. 19O when the first term is selected, and transits as shown in FIG. 19P when the second term is selected)

Since the calculations are enough to obtain the relative relationship among the $m_n(S9)-m_n(S0)$, the same number may be added to them or multiplied by them. For example, $m_n(S0)$ may be subtracted from each of the $m_n(S9)-m_n(S0)$ to produce new $m_n(S9)-m_n(S0)$. In this case, the new $m_n(S0)$ is "0".

In the embodiment of the invention, the seven levels/the ten levels of data are weighted and the playback data is determined. This is because the importance of the seven levels of data and the ten levels of data may be different from each other according to characteristics of recording/playback or recording medium. To weight each of the seven levels/the ten levels of data, error rate will be further decreased. The actual optimal weight may be determined by some experiments.

Herein, let w be an weight coefficient of the seven levels of data. Then, weight coefficient of the ten levels of data is 1-w, the following equations are determined.

$$m_n(S9)=m_{n-1}(S7)+(1-w)(2y_{21}+1) \quad (1)$$

(the path transits as shown in FIG. 19A)

$$m_n(S8) = m_{n-1}(S7) + (1-w)(4y_{21}+4) \quad (2)$$

(the path transits as shown in FIG. 19B)

$$m_n(S7) = \min[m_{n-1}(S4) + w(-4y_{20}+4) + (1-w)(-2y_{21}+1), m_{n-1}(S6) + w(-8y_{21}+16) + (1-w)(-4y_{21}+4)] \quad (3)$$

(the path transits as shown in FIG. 19C when the first term is selected, and transits as shown in FIG. 19D when the second term is selected)

$$m_n(S6) = \min[m_{n-1}(S3) + w(-8y_{20}+16) + (1-w)(-8y_{21}+16), m_{n-1}(S5) + w(-12y_{20}+36) + (1-w)(-10y_{21}+25)] \quad (4)$$

(the path transits as shown in FIG. 19E when the first term is selected, and transits as shown in FIG. 19F when the second term is selected)

$$m_n(S5) = \min[m_{n-1}(S3) + w(-8y_{20}+16) + (1-w)(-10y_{21}+25), m_{n-1}(S5) + w(-12y_{21}+36) + (1-w)(-12y_{21}+36)] \quad (5)$$

(the path transits as shown in FIG. 19G when the first term is selected, and transits as shown in FIG. 19H when the second term is selected)

$$m_n(S4) = m_{n-1}(S2) + (1-w)(-2y_{21}+1) \quad (6)$$

(the path transits as shown in FIG. 19I)

$$m_n(S3) = m_{n-1}(S2) + (1-w)(-4y_{21}+4) \quad (7)$$

(the path transits as shown in FIG. 19J)

$$m_n(S2) = \min[m_{n-1}(S9) + w(-4y_{20}+4) + (1-w)(2y_{21}+1), m_{n-1}(S1) + w(8y_{20}+16) + (1-w)(4y_{21}+4)] \quad (8)$$

(the path transits as shown in FIG. 19K when the first term is selected, and transits as shown in FIG. 19L when the second term is selected)

$$m_n(S1) = \min[m_{n-n}(S8) + w(8y_{20}+16) + (1-w)(8y_{21}+16), m_{n-n}(S0) + w(12y_{20}+36) + (1-w)(10y_{21}+25)] \quad (9)$$

(the path transits as shown in FIG. 19M when the first term is selected, and transits as shown in FIG. 19N when the second term is selected)

$$m_n(S0) = \min[_{n-1}(S8) + w(8y_{20}+16) + (1-w)(10y_{21}+25), m_{n-1}(S0) + w(12y_{20}+36) + (1-w)(12y_{21}+36)] \quad (10)$$

(the path transits as shown in FIG. 19O when the first term is selected, and transits as shown in FIG. 19P when the second term is selected)

Since the calculations are enough to obtain the relative relationship among the $m_n(S9)-m_n(S0)$, the same number may be added to them or multiplied by them. For example, $m_n(S0)$ may be subtracted from each of the $m_n(S9)-m_n(S0)$ to produce new $m_n(S9)-m_n(S0)$. In this case, the new $m_n(S0)$ is "0".

The above example, the weight coefficient w is applied to the seven levels of data and the weight coefficient 1−w is applied to the ten levels of data. However, the weight coefficient w may be applied to the ten levels of data and the weight coefficient 1−w may be applied to the seven levels of data.

Also, according to characteristic of recording/playback and recording medium, the importance of the seven levels/ the ten levels of data may be different for each level. Then, preparing two kinds of weight coefficients w0, w1, when data level of the seven levels 9or ten levels) of data exceeds (or equal to) a predetermined threshold value L, w0 may be assigned as the weight coefficient, and when data level of the seven levels (or ten levels) of data is less than or equal to the threshold value L, w1 is assigned as the weight coefficient. To do this, error rate will be further decreased. The actual optimal weight coefficient and the threshold value may be determined by some experiments.

For example, let the threshold value L be −0.2, w0 be 0.375, and w1 be 0.75. Herein, if the seven levels of data should be controlled, the seven levels and the ten levels of data are shown as follows.

The seven levels of data; −0.8, −0.7, 0.1, 0.6, 0.3, −0.6

The ten levels of data; −0.7, −0.4, 0.3, 0.5, −0.4, −0.9

As a result, w0 is assigned to w when the seven levels of data exceeds to the threshold value L, and w1 is assigned to w when the seven levels of data is less than the threshold value L. Therefore, value of w transits as follows; 0.75, 0.75, 0.375, 0.375, 0.375, 0.75.

As described above, $m_n(S9)-m_n(S0)$ are calculated according to (1)–(10), paths of state transition are determined as shown in FIGS. 19A–19P (hereafter may be called (a)–(p), respectively, for convenience of description) and the determined paths are arranged.

Next, description is made about the paths of state transition. For the above-described (1)–(10), (a) is always selected at (1), (b) is always selected at (2), (i) is always selected at (6), (j) is always selected at (7), (c) or (d) is selected at (3), (e) or (f) is selected at (4), (g) or (h) is selected at (5), (k) or (l) is selected at (8), (m) or (n) is selected at (9), and (o) or (p) is selected at (10). In this case, for example, when (c) is selected at (3), (e) is selected at (4), (h) is selected at (5), (1) is selected at (8), (m) is selected at (9), and (o) is selected at (10) at time (n), (a), (b), (c), (e), (h), (i), (j), (l), (m), and (o) are selected by gathering (1)–(10). Herein, ten paths, (a)S7->S9, (b)S7->S8, (c)S4->S7, (e)S3->S6, (h)S5->S5, (i)S2->S4, (j)S2->S3, (l)S1->S2, (m)S8->S1, and (o)S8->S0, are selected from time n−1 to time n.

Hereinafter, ten paths of state transition are selected for each time, and the paths are arranged.

Figure 20:
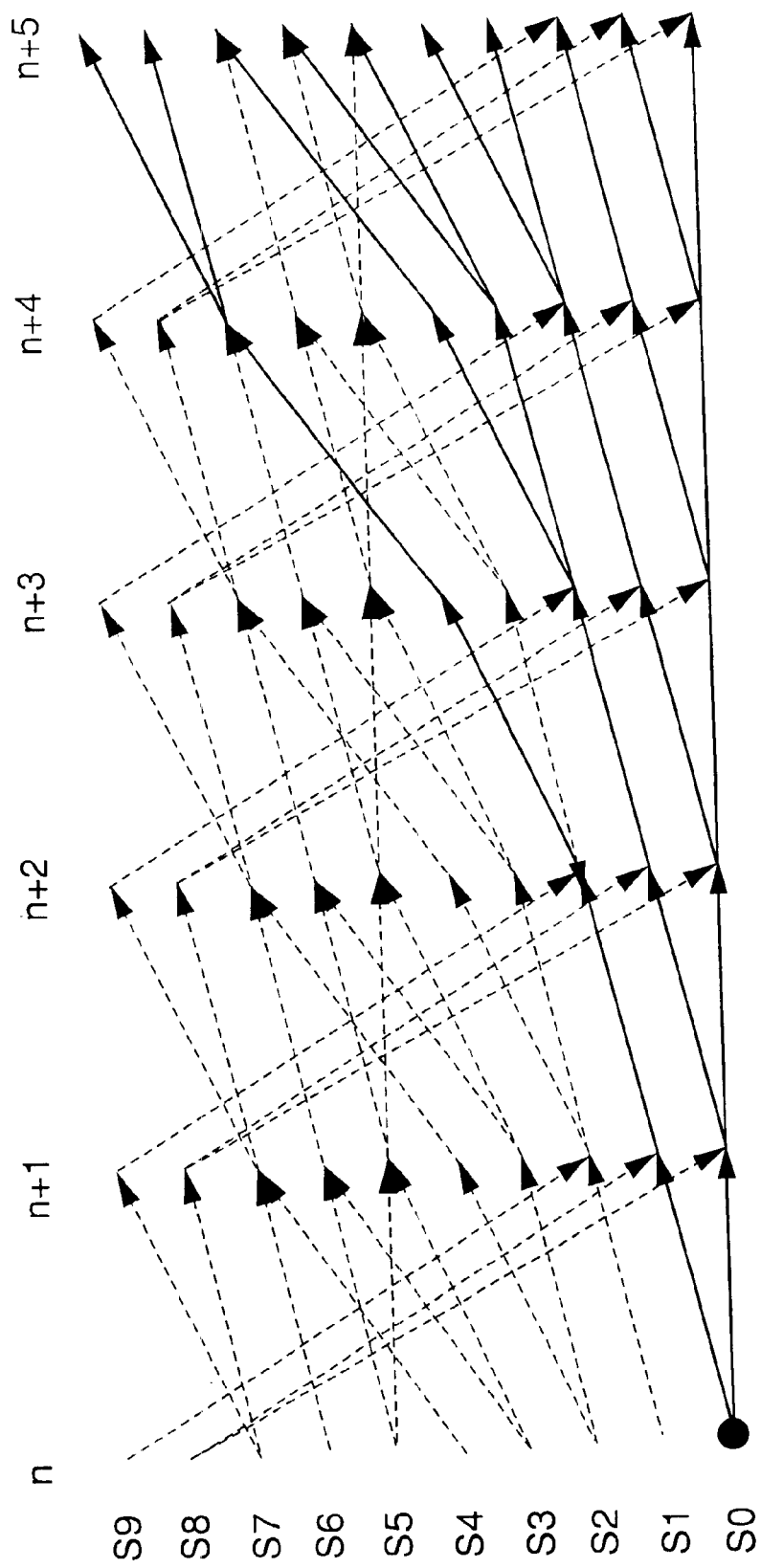
FIG. 20 shows a diagram for the purpose of illustrating path merge based on a partial response (1, 2, 2, 2)+a Viterbi decoding method of ten states.

Next, determination of path merge is performed. Example of the determination is shown in FIG. 20.

If (9):(n), (10):(p) are selected at time (n+1), (8):(1), (9):(n), (10):(p) are selected at time (n+2), (8):(1), (9):(n), (10):(p) are selected at time (n+3), (3):(c), (8):(1), (9):(n), (10):(p) are selected at time (n+4), and (3):(c), (4):(e), (5):(g), (8):(1), (9):(n), (10):(p) are selected at time (n+5), it is found that paths are connected into S0(•) at time n by going back the selected paths from the all states at time (n+5). This is referred to as gathering of paths into a point, in other words, "path merge". When the path merge occurred, former paths are determined from a point(•) to which the paths are gathered, and former data are determined using numerators of fractional numbers shown in FIG. 18.

Figure 21:
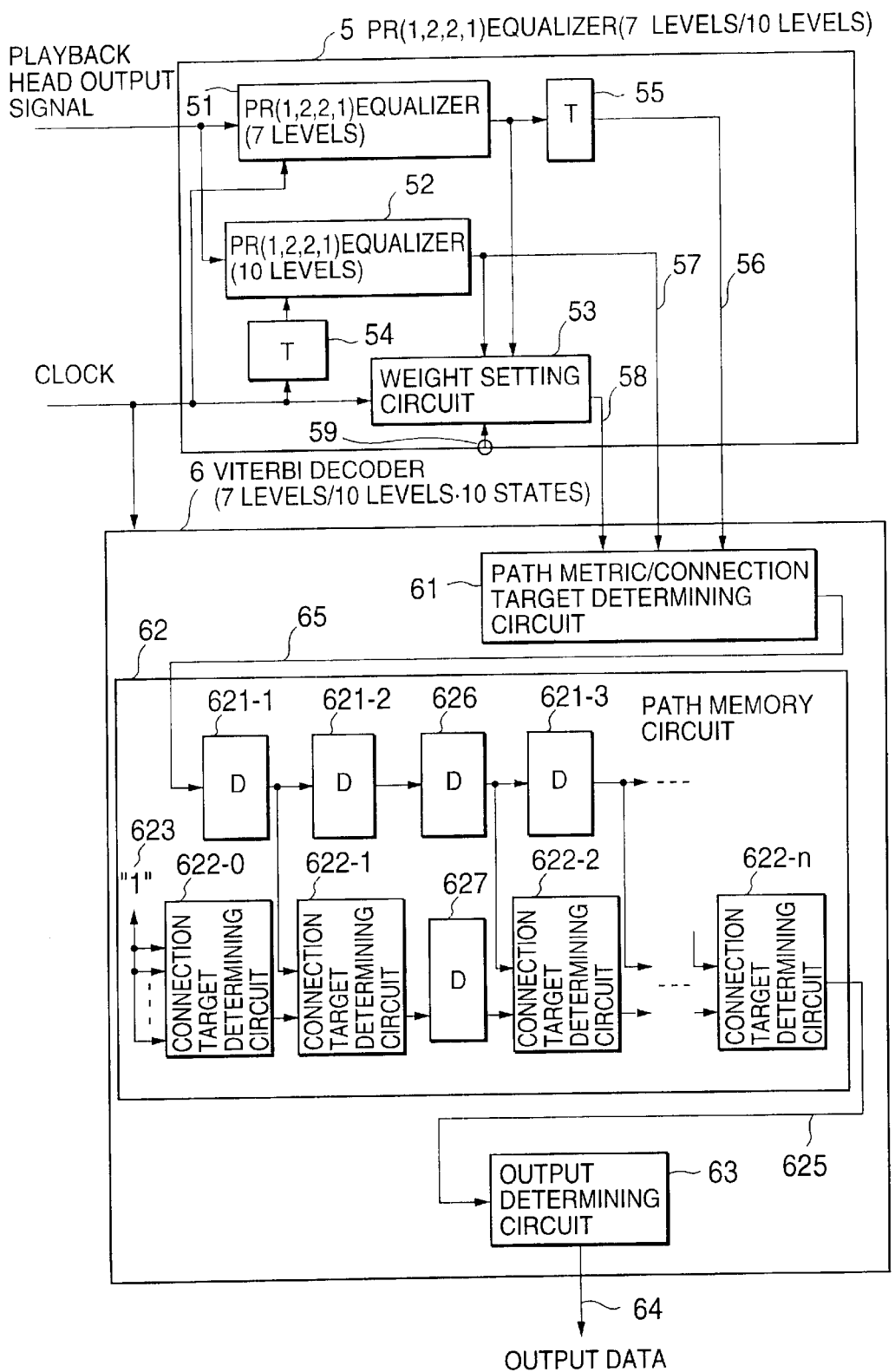
FIG. 21 shows a block diagram of another embodiment of a playback data detecting device according to the invention.

FIG. 21 shows a block diagram of a playback data detecting device which performs the above-mentioned method. The playback detecting device; includes a PR(1, 2, 2, 1) equalizer 5 which provides two types of data, namely, seven levels of data and the ten levels of data, and Viterbi decoder 6 with seven levels/ten levels and ten states.

The PR(1, 2, 2, 1) equalizer 5 is given output signals which are detected, for example, by a playback head. In this case, output signals may be recorded data recorded as a recorded code which has a minimum inverse metric of at least two. The PR(1, 2, 2, 1) equalizer 5 then converts the playback signals into seven levels of data and ten levels of data which resides in the intermediate time point between the seven levels of data, by carrying out partial response(1, 2, 2, 1) detection by using intersymbol correlation. Thereafter, the PR(1, 2, 2, 1) equalizer 5 supplies the seven levels of data 56 and ten levels of data 57 to the Viterbi decoder 6.

Such an equalizer 5, for example, may include a PR(1, 2, 2, 1) equalizer 51 which converts the playback head signals into the seven levels of data, and a PR(1, 2, 2, 1) equalizer 52 which converts the signals into the ten levels of data as shown in FIG. 21. In this case, operation clock signal may be delayed by a half a clock cycle by a delay circuit 54 and may be thereafter supplied to the PR(1, 2, 2, 1) equalizer 52. Consequently, the PR(1, 2, 2, 1) equalizer 52 can perform conversion of the ten levels of data which resides in the intermediate time point between the seven levels of data. Also, since the seven levels of data detected by the PR(1, 2, 2, 1) equalizer 51 and the ten levels of data detected by the PR(1, 2, 2, 1) equalizer 52 after a half clock cycle is past are provided in pair, output timing of the PR(1, 2, 2, 1) equalizer 51 is delayed a half clock cycle by a delay circuit 55 to match output timing of the seven levels of data 56 to the Viterbi decoder 6 with output timing of the ten levels of data 57 to the Viterbi decoder 6.

Further, the equalizer 5 includes a weight setting circuit 53 which sets a weight coefficient w to the seven levels of data or the ten levels of data. The weight coefficient 58 is supplied from the weight setting circuit 53 to the Viterbi decoder 6. A setting terminal 59 is connected to the weight setting circuit 53. The weight setting circuit 53 may select the value of the weight coefficient 58 or operation mode according to data given from the setting terminal 59. In other words, the weight coefficient and the operation mode can be selected in the following manner in response to the data given from the setting terminal 59 to the weight setting circuit 53.

(a) The weight coefficient w is always kept at a constant value.

(b) The two weight coefficients w0 and w1 are indicated together with a threshold value L to the seven levels of data. Herein, when the level of the seven levels of data from the PR(1, 2, 2, 1) equalizer 51 is not smaller than (namely, larger than or equal to) the threshold value L, w0 is supplied as the weight coefficient to the seven levels of data from the PR(1, 2, 2, 1) equalizer 51 for each clock cycle. When the level of the seven levels of data is not greater than (namely, less than or equal to) the threshold value L, w1 is supplied as the weight coefficient to the seven levels of data from the PR(1, 2, 2, 1) equalizer 51 for each clock cycle.

(c) The two weight coefficients w0 and w1 are indicated together with a threshold value L to the ten L levels of data. Herein, when the level of the ten levels of data from the PR(1, 2, 2, 1) equalizer 52 is not smaller than (namely, larger than or equal to) the threshold value L, w0 is supplied as the weight coefficient to the ten levels of data from the PR(1, 2, 2, 1) equalizer 52 for each clock cycle. When the level of the ten levels of data is not greater than (namely, less than or equal to) the threshold value L, w1 is supplied as the weight coefficient to the ten levels of data from the PR(1; 2, 2, 1) equalizer 52 for each clock cycle.

The embodiment of the invention may be employed which does not set such an weight coefficient w to the seven levels of data or the ten levels of data.

Responsive to the seven levels of data 56, the ten levels of data 57, and the weight coefficient 58 from the PR(1, 2, 2, 1) equalizer 5 for each clock cycle, the Viterbi decoder 6 performs Viterbi decoding operation according to a predetermined state transition rules to produce an output data 64. In the illustrated example, the Viterbi decoder 6 includes a path metric/connection target determining circuit 61, a path memory circuit 62, and an output determining circuit 63.

The path metric/connection target determining circuit 61 determines $m_n n(S9)-m_n (S0)$ based on the seven levels of data 56 ($Y_{20}$), the ten levels of data 57 ($y_{21}$), $m_{n-1}(S9)-m_{n-1}(S0)$, and the weight coefficient 58, and determines a connection target which is connected at a previous time point before one clock cycle from the present time point for each of states S7, S6, S5, S2, S1 and S0. The determining circuit 61 provides the results to the path memory circuit 62 as connection target data 65. In this event, the connection target data 65 includes "0" when S7 at the present time point is connected to S4 at the previous time point before one clock cycle from the present time point, and includes "1" when S7 at the present time point is connected to S6 at the previous time point before one clock cycle from the present time point. Further,; the connection target data 65 includes "0" when S6 at the present time point is connected to S3 at the previous time point before one clock cycle from the present time point, and includes "1" when S6 at the present time point is connected to S5 at the previous time point before one clock cycle from the present time point. And further, the connection target data 65 includes "0" when S5 at the present time point is connected to S3 at the previous time point before one clock cycle from the present time point, and includes "1" when S5 at the present time point is connected to S5 at the previous time point before one clock cycle from the present time point. Still further, the connection target data 65 includes "0" when S2 at the present time point is connected to S9 at the previous time point before one clock cycle from the present time point, and includes "1" when S2 at the present time point is connected to Si at previous time point before one clock cycle from the present time point. Still further, the connection target data 65 includes "0" when S1 at the present time point is connected to S8 at the previous time point before one clock cycle from the present time point, and includes "1" when S1 at the present time point is connected to S0 at the previous time point before one clock cycle from the present time point. Still further, the connection target data 65 includes "0" when S0 at the present time point is connected to S8 at the previous time point before one clock cycle from the present time point, and includes "1" when S0 at the present time point is connected to S0 at the previous time point before one clock cycle from the present time point.

Each data is represented by six bits corresponding to S7, S6, S5, S2, S1 and S0.

The path memory circuit 62 stores the connection target data 65 at every clock cycle and keep the target data over several tens of steps (clock cycles) and examines a sequence of the target data and selects a single one of paths (path merge) based on the connection target data 65.

The path memory circuit 62 includes data latches (for example, D-type flip flops) 621-1, 621-2, 621-3, . . . each of which stores the connection target data 65 over several tens of stages (clock cycles). The current data is supplied to the data latch which resides in the leftmost one of the data latches and is successively delayed or shifted rightwards of FIG. 7. Therefore, as the data latches go rightwards older data is stored in the data latches. Also, for each steps of the data latches, the connection target determining circuits 622-

1, 622-2, ..., 622-n are connected, and the connection target determining circuit 622-0 may be considered to be connected to a zeroth step of the data latches.

The connection target determining circuit 622-0 for the zeroth step receives data 623 in which all bits are "1" as initial value. The circuit 622-0 provides output data 624 composed of the bits which are in one-to-one correspondence to the states S0–S9 and which take "1" to specify any one of the states S0–S9 in the next clock cycle.

Each of the connection target determining circuits 622-1, 622-2, ..., 622-n for the steps after the zeroth step receives ten bits of output data from a previous step of the connection target determining circuit and the connection target data 65 from the data latch which corresponds to the step. Under the circumstances, each determining circuit determines, for each states S0–S9, whether or not the state may be selected and, sets "1" to the bit which corresponds to the state if the state may be selected. On the other corresponds to the state if the state may not be selected, and sends the resulting bits to another connection target determining circuit for the next step. Therefore, for each of the states S9, S8, S7, S6, S5, S4, S3, S2, S1, and S0, the connection target to which the path is connected at a time point before one clock cycle from the present time point is determined based on the following elements.
(1) The received six bits of data from the data latch which corresponds to the step.
(2) Whether the connection at the next clock cycle is performed or not is determined based on the received ten bits from the connection target determining circuit for the former step.
(3) Ten bits of data which represents the path may be connected at a time point before one clock cycle from the present time point is sent to the connection target determining circuit for the next step.

Specifically, description will be made about the state S9. If the connection to S9 is made one clock after in response to an output sent from a previous one of the determining circuit, the bit which corresponds to S7 of the output supplied to the next one of the determining circuit is set into "1".

As to the state S8, when the connection at the next clock cycle is performed in response to an output from the connection target determining circuit for the former step, "1" is set to the bit, which corresponds to the state S7 included in an output to the connection target determining circuit for the next step.

For state S7, when the connection at the next clock cycle is performed in response to an output from the connection target determining circuit for the former step and when data which corresponds to state S7 from data latch which corresponds to the step is "0", "1" is set to the bit, which corresponds to the state S4 included in an output to the connection target determining circuit for the next step. On the other hand, when data which corresponds to state S7 from data latch which corresponds to the step is "1", "1" is set to the bit, which corresponds to the state S6, in an output to the connection target determining circuit for the next step.

For state S6, when the connection at the next clock cycle is performed in response to an output from the connection target determining circuit for the former step and when data which corresponds to state S6 from data latch which corresponds to the step is "0", "1" is set to the bit, which corresponds to the state S3 included in an output to the connection target determining circuit for the next step. On the other hand, when data which corresponds to state S6 from data latch which corresponds to the step is "1", "1" is set to the bit, which corresponds to the state S5, in an output to the connection target determining circuit for the next step.

For state S5, when the connection at the next clock cycle is performed in response to an output from the connection target determining circuit for the former step and when data which corresponds to state S5 from data latch which corresponds to the step is "0", "1" is set to the bit, which corresponds to the state S3 included in an output to the connection target determining circuit for the next step. On the other hand, when data which corresponds to state S5 from data latch which corresponds to the step is "1", "1" is set to the bit, which corresponds to the state S5, in an output to the connection target determining circuit for the next step.

For state S4, when the connection at the next clock cycle is performed in response to an output from the connection target determining circuit for the former step, "1" is set to the bit, which corresponds to the state S2 included in an output to the connection target determining circuit for the next step.

For state S3, when the connection at the next clock cycle is performed in response to an output from the connection target determining circuit for the former step, "1" is set to the bit, which corresponds to the state S2 included in an output to the connection target determining circuit for the next step.

For state S2, when the connection at the next clock cycle is performed in response to an output from the connection target determining circuit for the former step and when data which corresponds to state S2 from data latch which corresponds to the step is "0", "1" is set to the bit, which corresponds to the state S9 included in an output to the connection target determining circuit for the next step. On the other hand, when data which corresponds to state S2 from data latch which corresponds to the step is "0", "1" is set to the bit, which corresponds to the state S1, in an output to the connection target determining circuit for the next step.

For state S1, when the connection at the next clock cycle is performed in response to an output from the connection target determining circuit for the former step and when data which corresponds to state S1 from data latch which corresponds to the step is "1", "1" is set to the bit, which corresponds to the state S8 included in an output to the connection target determining circuit for the next step. On the other hand, when data which corresponds to state S1 from data latch which corresponds to the step is "1", "1" is set to the bit, which corresponds to the state S0, in an output to the connection target determining circuit for the next step.

For state S0, when the connection at the next clock cycle is performed in response to an output from the connection target determining circuit for the former step and when data which corresponds to state S0 from data latch which corresponds to the step is "0", "1" is set to the bit, which corresponds to the state S8 included in an output to the connection target determining circuit for the next step. On the other hand, when data which corresponds to state S0 from data latch which corresponds to the step is "1", "1" is set to the bit, which corresponds to the state S5, in an output to the connection target determining circuit for the next step.

In any case, when "1" is not set to a bit, the value of the bit is "0".

As described above, by using multiple connections of the connection target determining circuits 622-0, 622-1, ..., 622-n, the states to which the path may be connected are limited or decreased as the steps proceed, that is, as are returned back to the past clock cycle. Finally, path is merged with a single path, and thus, path merge is carried out.

An output 625 of the path memory circuit 62 is obtained from the connection target determining circuit for the last step 622-n, and is configured by ten bits which correspond to S0, S1, S2, S3, S4, S5, S6, S7, S8 and S9 one by one. The output 625 is set to "1" when the path may be connected to any of states S0–S9, and is set to "0" when the path may not be connected. Herein, when the path merge is performed, one bit of the ten bits is set to "1" and the other bits are set to "0".

Data latches 626 and 627 in the path memory circuit 62 shown in FIG. 21 have timing adjust functions to prevent hardware malfunction which occurs when the delay time exceeds a clock cycle due to multiple connections.

An output calculating circuit 63 determines an output data 64 from a path which is uniquely determined from the output 625 of the path memory circuit 62. Herein, the output data 64 is obtained based on the numerators of the fractional numbers shown in FIG. 18.

When the path merge is not performed, that is, there are at least two bits including value "1" in the ten bits of output 625, the number of paths (bits) which corresponds to the output data "0" in the output 625 is compared with the number of paths (bits) which corresponds to the output data "1" in the output 625. If the former number is larger than the later, the output is "0", and otherwise, the output is "1".

As described above, the following effects are obtained.

Since it is possible to discriminate between importance of the three levels of data and importance of the two levels of data in using the PR(1,1) equalization+the Viterbi method of three levels/two levels and four states, when there is difference between importance of the three levels of data and importance of the two levels of data due to the difference of recording/playback characteristics or recording medium characteristics, an error rate may be further decreased. In particular, in an embodiment of the invention, for each clock cycle, either of the three levels of data or the two levels of data is compared with a threshold value L, according to the result, a decoding weight w is selected from a predetermined value w0 or w1. In this embodiment, even if there is difference between importance of the three levels of data and importance of the two levels of data for each level, due to the difference of recording/playback characteristics or recording medium characteristics, desirable decoding may be performed.

The PR(1,1) equalization+the Viterbi method of three levels/two levels and four states are enhanced to the Viterbi decoding method of six states and ability to correct bit error is further improved. Also, when the weight is used, if there is difference between importance of the four levels of data and importance of the seven levels of data due to the difference of recording/playback characteristics or recording medium characteristics, an error rate may be further reduced. In particular, in an embodiment of the invention, for each clock cycle, either of the four levels of data or the seven levels of data is compared with a threshold value L, according to the result, a decoding weight w is selected from a predetermined value w0 or w1 and used. In this embodiment, even if there is difference between importance of the four levels of data and importance of the seven levels of data, for each level, due to the difference of recording/ playback characteristics or recording medium characteristics, desirable decoding may be performed.

The PR(1,1) equalization+the Viterbi method of three levels/two levels and four states are enhanced to the Viterbi method of ten states and ability to correct bit error is further improved. Also, when the weight is used, if there is difference between importance of the seven levels of data and importance of the ten levels of data due to the difference of recording/playback characteristics or recording medium characteristics, error rate may be further reduced. In particular, in an embodiment of the invention, for each clock cycle, either of the seven levels of data or the ten levels of data is compared with a threshold value L, according to the result, a decoding weight w is selected from a predetermined value w0 or w1 and used. In this embodiment, even if there is difference between importance of the seven levels of data and importance of the ten levels of data, for each level, due,to the difference of recording/playback characteristics or recording medium characteristics, desirable decoding may be performed.

What is claimed is:

1. A playback data detecting device which playsback recording data which are recorded using signals in which the number of continuous non-inverse signals is at least "2", comprising:

a PR(1, 1) equalizer which receives playback signals of the recording data, converts the signals into three levels of data and two levels of data which resides in the intermediate point between the three levels of data in time; and a four state Viterbi decoder which performs Viterbi decoding based on transition rules for transition of playback states S0, S1, S2, and S3, which correspond to the three levels of data and the two levels of data.

2. The playback data detecting device claimed in claim 1, wherein the transition rules include (1) when the three levels of "−1" and the two levels of "−1" are input in the state S0, the four state Viterbi decoder makes a transition to state S0 and provides the value "0" as output, (2) when the three levels of "0" and the two levels of "1" are input in the state S0, the four state Viterbi decoder makes a transition to state S1 and provides the value "1" as output, (3) when the three levels of "1" and the two levels of "1" are input in the state S1, the four state Viterbi decoder makes a transition to state S2 and provides the value "0" as output, (4) when the three levels of "1" and the two levels of "1" are input in the state S2, the four state Viterbi decoder makes a transition to state S2 and provides the value "0" as output, (5) when the three levels of "0" and the two levels of "−1" are input in the state S2, the four state Viterbi decoder makes a transition to state S3 and provides the value "1" as output, (6) when the three levels of "−1" and the two levels of "−1" are input in the state S3, the four state Viterbi decoder makes a transition to state S0 and provides the value "0" as output.

3. The playback data detecting device claimed in claim 1, wherein the four state Viterbi decoder determines a state transition path using metrics which represent a probability of state transition.

4. The playback data detecting device claimed in claim 3, wherein the four state Viterbi decoder uses the metrics each of which is produced by adding a first metric to a second metric, the first metric is a negative logarithm of state transition probability of the three levels of data, and the second metric is a negative logarithm of state transition probability of the two levels of data.

5. The playback data detecting device claimed in claim 4, wherein the four state Viterbi decoder applies a weight w to one of the first metric and the second metric and applies an weight (1−w) to the other.

6. The playback data detecting device claimed in claim 5, wherein the four state Viterbi decoder, for each clock, compares one of the levels of the three levels of data and the two levels of data with a threshold value L, and selects one weight between w0 and w1 as the weight w according to the comparison.

7. The playback data detecting device claimed in claim 1, wherein the four state Viterbi decoder determines states which are selected at a time point before one clock cycle from the present time point based on states which are selected at the present time and paths which arrive from the point to the present time, connects the states and the paths subordinately in a plurality of clock cycles, and supplies output data which corresponds to the limited state when the connected states are limited to a state by reversing the paths.

8. The playback data detecting device claimed in claim 7, wherein the four state Viterbi decoder compares when the connected states are not limited to a state, the number of the states which corresponds to the output data "0" with number of the states which corresponds to the output data "1" supplies the output data "0" when the former number is greater than the later, and supplies the output data "1" when the former number is less than the later.

9. The playback data detecting device claimed in claim 7, wherein the four state Viterbi decoder comprises a path metric/connection target determining circuit, a path memory circuit, and an output determining circuit.

10. A playback data detecting device which playsback recording data which are recorded using signals in which the number of continuous non-inverse signals is at least "2", comprising:
  a PR(1, 2, 1) equalizer which receives playback signals of the recording data, converts the signals into four levels of data and seven levels of data which resides in the intermediate point between the four levels of data in time; and
  a six state Viterbi decoder which performs Viterbi decoding based on transition rules for transition of playback states S0, S1, S2, S3, S4 and S5, which correspond to the four levels of data and the seven levels of data.

11. The playback data detecting device claimed in claim 10, wherein the transition rules including (1) when the four levels of "−4" and the seven levels of "−4" are input in the state S0, the six state Viterbi decoder makes a transition to state S0 and provides the value "0" as output, (2) when the four levels of "−4" and the seven levels of "−3" are input in the state S0, the six state Viterbi decoder makes a transition to state S1 and provides the value "0" as output, (3) when the four levels of "−2" and the seven levels of "0" are input in the state S1, the six state Viterbi decoder makes a transition to state S2 and provides the value "1" as output, (4) when the four levels of "2" and the seven levels of "3" are input in the state S2, the six state Viterbi decoder makes a transition to state S3 and provides the value "0" as output, (5) when the four levels of "2" and the seven levels of "2" are input in the state S2, the six state Viterbi decoder makes a transition to state S4 and provides the value "0" as output, (6) when the four levels of "4" and the seven levels of "4" are input in the state S3, the six state Viterbi decoder makes a transition to state S3 and provides the value "0" as output, (7) when the four levels of "4" and the seven levels of "3" are input in the state S3, the six state Viterbi decoder makes a transition to state S4 and provides the value "0" as output, (8) when the four levels of "2" and the seven levels of "0" are input in the state S4, the six state Viterbi decoder makes a transition to state S5 and provides the value "1" as output, (9) when the four levels of "2" and the seven levels of "−3" are input in the state S5, the six state Viterbi decoder makes a transition to state S0 and provides the value "0" as output, (10) when the four levels of "−2" and the seven levels of "−2" are input in the state S5, the six state Viterbi decoder makes a transition to state S0 and provides the value "0" as output.

12. The playback data detecting device claimed in claim 10, wherein the six state Viterbi decoder determines a state transition path using metrics which represent a probability of state transition.

13. The playback data detecting device claimed in claim 12, wherein the six state Viterbi decoder uses the metrics each of which is produced by adding a first metric to a second metric, the first metric is a negative logarithm of state transition probability of the four levels of data, and the second metric is a negative logarithm of state transition probability of the seven levels of data.

14. The playback data detecting device claimed in claim 13, wherein the six state Viterbi decoder applies a weight w to one of the first metric and the second metric and applies an weight (1−w) to the other.

15. The playback data detecting device claimed in claim 14, wherein the six state Viterbi decoder, for each clock, compares one of the levels of the four levels of data and the seven levels of data with a threshold value L, and selects one weight between w0 and w1 as the weight w according to the comparison.

16. The playback data detecting device claimed in claim 10, wherein the six state Viterbi decoder determines states which are selected at a time point before one clock cycle from the present time point based on states which are selected at the present time and paths which arrive from the point to the present time, connects the states and the paths subordinately in a plurality of clock cycles, and supplies output data which corresponds to the limited state when the connected states are limited to a state by reversing the paths.

17. The playback data detecting device claimed in claim 16, wherein the six state Viterbi decoder compares when the connected states are not limited to a state, the number of the states which corresponds to the output data "0" with number of the states which corresponds to the output data "1", supplies the output data "0" when the former number is greater than the later, and supplies the output data "1" when the former number is less than the later.

18. The playback data detecting device claimed in claim 16, wherein the six Viterbi decoder comprises a path metric/connection target determining circuit, a path memory circuit, and an output determining circuit.

19. A playback data detecting device which playsback recording data which are recorded using signals in which the number of continuous non-inverse signals is at least "2", comprising: a PR(1, 2, 2, 1) equalizer which receives playback signals of the recording data, converts the signals into seven levels of data and ten levels of data which resides in the intermediate point between the seven levels of data in time; and
  a ten state Viterbi decoder which performs Viterbi decoding based on transition rules for transition of playback states S0, S1, S2, S3, S4, S5, S6, S7, S8 and S9, which correspond to the seven levels of data and the ten levels of data.

20. The playback data detecting device claimed in claim 19, wherein the transition rules including: (1) when the seven levels of "−6" and the ten levels of "−6" are input in the state S0, the ten state Viterbi decoder makes a transition to state S0 and provides the value "0" as output, (2) when the seven levels of "6" and the ten levels of "−5" are input in the state S0, the ten state Viterbi decoder makes a transition to state S1 and provides the value "0" as output, (3) when the seven levels of "4" and the ten levels of "−2" are input in the state S1, the ten state Viterbi decoder makes a transition to state S2 and provides the value "0" as output, (4) when the seven levels of "0" and the ten levels of "2" are input in the state S2, the ten state Viterbi decoder makes a transition to state S3 and provides the value "1" as output, (5) when the seven levels of "0" and the ten levels of "1" are input in the state S2, the ten state Viterbi decoder makes a transition to state S4 and provides the value "1" as output, (6) when the seven levels of "4" and the ten levels of "5" are input in the state S3, the ten state Viterbi decoder makes a transition to state S5 and provides the value "0" as output, (7) when the seven levels of "4" and the ten levels of "4" are input in the state S3, the ten state Viterbi decoder makes a transition to state S6 and provides the value "0" as output, (8) when the seven levels of "2" and the ten levels of "1" are input in the state S4, the ten state Viterbi decoder makes a transition to state S7 and provides the value "0" as output, (9) when the seven levels of "6" and the ten levels of "6" are input in the state S5, the ten state Viterbi decoder makes a transition to state S5 and provides the value "0" as output, (10) when the seven levels of "6" and the ten levels of "5" are input in the state S5, the ten state Viterbi decoder makes a transition to state S6 and provides the value "0" as output, (11) when the seven levels of "4" and the ten levels of "2" are input in the state S6, the ten state Viterbi decoder makes a transition to state S7 and provides the value "0" as output, (12) when the seven levels of "0" and the ten levels of "−2" are input in the state S7, the ten state Viterbi decoder makes a transition to state S8 and provides the value "1" as output, (13) when the seven levels of "0" and the ten levels of "−1" are input in the state S7, the ten state Viterbi decoder makes a transition to state S9 and provides the value "1" as output, (14) when the seven levels of "4" and the ten levels of "−5" are input in the state S8, the ten state Viterbi decoder makes a transition to state S0 and provides the value "0" as output, (15) when the seven levels of "−4" and the ten levels of "−4" are input in the state S8, the ten state Viterbi decoder makes a transition to state S1 and provides the value "0" as output, (16) when the seven levels of " " and the ten levels of "1" are input in the state S9, the ten state Viterbi decoder makes a transition to state S2 and provides the value "0" as output.

21. The playback data detecting device claimed in claim 19, wherein the ten states of Viterbi decoder determines a state transition path using metrics which represent a probability of state transition.

22. The playback data detecting device claimed in claim 21, wherein the ten state Viterbi decoder uses the metrics each of which is produced by adding a first metric to a second metric, the first metric is a negative logarithm of state transition probability of the seven levels of data, and the second metric is a negative logarithm of state transition probability of the ten levels of data.

23. The playback data detecting device claimed in claim 22, wherein the ten state Viterbi decoder applies a weight w to one of the first metric and the second metric and applies an weight (1−w) to the other.

24. The playback data detecting device claimed in claim 23, wherein the ten state Viterbi decoder, for each clock, compares one of the levels of the seven levels of data and the ten levels of data with a threshold value L, and selects one weight between w0 and w1 as the weight w according to the comparison.

25. The playback data detecting device claimed in claim 19, wherein the ten state Viterbi decoder determines states which are selected at a time point before one clock cycle from the present time point based on states which are selected at the present time and paths which arrive from the point to the present time, connects the states and the paths subordinately in a plurality of clock cycles, and supplies output data which corresponds to the limited state when the connected states are limited to a state by reversing the paths.

26. The playback data detecting device claimed in claim 25, wherein the ten state Viterbi decoder compares when the connected states are not limited to a state, the number of the states which corresponds to the output data "0" with number of the states which corresponds to the output data "1", supplies the output data "0" when the former number is greater than the later, and supplies the output data "1" when the former number is less than the later.

27. The playback data detecting device claimed in claim 25, wherein the ten state Viterbi decoder comprises a path metric/connection target determining circuit, a path memory circuit, and an output determining circuit.

* * * * *